US012205571B2

(12) United States Patent
Kim et al.

(10) Patent No.: US 12,205,571 B2
(45) Date of Patent: Jan. 21, 2025

(54) ELECTRONIC DEVICE AND CONTROLLING METHOD THEREOF

(71) Applicant: SAMSUNG ELECTRONICS CO., LTD., Suwon-si (KR)

(72) Inventors: Sungjin Kim, Suwon-si (KR); Sohee Kim, Suwon-si (KR); Haekeu Park, Suwon-si (KR); Juhee Chang, Suwon-si (KR); Hyeonyeong Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 285 days.

(21) Appl. No.: 17/970,464

(22) Filed: Oct. 20, 2022

(65) Prior Publication Data

US 2023/0206892 A1 Jun. 29, 2023

Related U.S. Application Data

(63) Continuation of application No. PCT/KR2022/014867, filed on Oct. 4, 2022.

(30) Foreign Application Priority Data

Dec. 29, 2021 (KR) ........................ 10-2021-0191683
Mar. 15, 2022 (KR) ........................ 10-2022-0032337

(51) Int. Cl.
*G10K 11/178* (2006.01)
*H04R 3/00* (2006.01)

(52) U.S. Cl.
CPC .. *G10K 11/17817* (2018.01); *G10K 11/17835* (2018.01); *H04R 3/00* (2013.01); *H04R 2410/05* (2013.01)

(58) Field of Classification Search
CPC ....... G10K 11/17817; G10K 11/17835; G10K 2210/1081; H04R 3/00; H04R 2410/05; H04R 1/1083
See application file for complete search history.

(56) References Cited

U.S. PATENT DOCUMENTS 10,147,413 B2 * 12/2018 Magrath ............ G10K 11/1783
10,283,103 B2 5/2019 Kumar
(Continued)

FOREIGN PATENT DOCUMENTS

JP 7163300 10/2022
KR 10-2014-0006394 1/2014
(Continued)

OTHER PUBLICATIONS

Search Report dated Jan. 12, 2023 in International Patent Application No. PCT/KR2022/014867.
(Continued)

*Primary Examiner* — Jason R Kurr
(74) *Attorney, Agent, or Firm* — Nixon & Vanderhye, P.C.

(57) ABSTRACT

An electronic device may include at least one microphone, a speaker, and a processor operatively connected to the at least one microphone and the speaker, wherein the processor may be configured to configure an operation frequency of the microphone as a first frequency and receive an external audio signal from the outside of the electronic device through the microphone operating in the first frequency, generate a first audio signal using the received external audio signal, acquire noise signal information, based on the first audio signal, output a second audio signal generated based on the noise signal information through the speaker, determine a second frequency, based on the generated second audio signal, and change the operation frequency of the microphone to the second frequency and receive the external
(Continued)

audio signal from the outside of the electronic device through the microphone operating at the second frequency.

20 Claims, 12 Drawing Sheets

(56) References Cited

U.S. PATENT DOCUMENTS

| | | | | |
|---|---|---|---|---|
| 10,302,763 | B2 | 5/2019 | Kang et al. | |
| 10,313,789 | B2 | 6/2019 | Ushakov | |
| 10,347,233 | B2 | 7/2019 | Park et al. | |
| 10,564,925 | B2 | 2/2020 | An et al. | |
| 10,810,990 | B2 * | 10/2020 | Vogel | G10K 11/17854 |
| 10,950,213 | B1 * | 3/2021 | Lu | G10K 11/17881 |
| 2017/0110106 | A1 * | 4/2017 | Kumar | G10K 11/17817 |
| 2017/0133002 | A1 | 5/2017 | Jung | |
| 2018/0151172 | A1 | 5/2018 | Min | |
| 2018/0234757 | A1 | 8/2018 | Christoph | |

FOREIGN PATENT DOCUMENTS

| | | |
|---|---|---|
| KR | 10-1699067 | 2/2017 |
| KR | 10-2017-0052056 | 5/2017 |
| KR | 10-2017-0055329 | 5/2017 |
| KR | 10-2017-0142001 | 12/2017 |
| KR | 10-2018-0099041 | 9/2018 |
| KR | 10-1953866 | 3/2019 |

OTHER PUBLICATIONS

Written Opinion dated Jan. 12, 2023 in International Patent Application No. PCT/KR2022/014867.

* cited by examiner

ELECTRONIC DEVICE AND CONTROLLING METHOD THEREOF

CROSS-REFERENCE TO RELATED APPLICATION(S)

This application is a continuation of PCT/KR2022/014867, filed on Oct. 4, 2022, at the Korean Intellectual Property Receiving Office and claiming priority to Korean Patent Application No. 10-2021-0191683, filed on Dec. 29, 2021, and to Korean Patent Application No. 10-2022-0032337, filed on Mar. 15, 2022, in the Korean Intellectual Property Office, the disclosures of each which are incorporated by reference herein in their entireties.

BACKGROUND

Field

The disclosure relates to an electronic device outputting a sound and a method of controlling the same.

Description of Related Art

With the development of digital technologies, various types of electronic devices such as mobile communication terminals, personal digital assistants (PDAs), electronic organizers, smartphones, tablet personal computers (PCs), or wearable devices have become widely used. The electronic devices may be connected to external devices such as notebooks, earphones, or headphones through a short-range wireless technology such as Bluetooth to exchange information. For example, the electronic device may be connected to earphones through Bluetooth to output music or sounds of a video through the earphones.

For example, various audio devices such as earphones or headphones are used as electronic devices for outputting sounds. According to a user's demand for audio devices, various technologies have been proposed and developed to improve a sound quality of the audio devices and increase portability thereof. For the audio devices, a 'noise cancelling (active noise cancelling (ANC))' technology is being developed to adaptively block noise generated due to an external sound (for example, noise). Further, audio devices in the form of 'wireless earphones (true wireless stereo (TWS)) (or a wireless output device)' which can be wirelessly connected to an external device (for example, a smartphone) to be carried have been released.

SUMMARY

The size of a battery of an electronic device, for example, a wireless earphone device, has decreased according to the trend of small size as demands for portability increase, and thus it may be difficult to simultaneously satisfy advanced performance of an ANC technology according to demands for the advanced performance and an increase in use time through a decrease in power consumption. Further, in terms of advanced performance, a power-efficient ANC control technology for reducing not only external noise but also noise generated by the electronic device itself is needed.

According to various embodiments of the disclosure, the electronic device may control a Mic (microphone) clock according to a surrounding circumstance while the ANC is supported.

An electronic device according to various embodiments of the disclosure includes at least one microphone, a speaker, and a processor operatively connected to the at least one microphone and the speaker, wherein the processor is configured to configure an operation frequency of the microphone as a first frequency and receive an external audio signal from outside of the electronic device through the microphone operating at the first frequency, generate a first audio signal using the received external audio signal, acquire noise signal information, based on the first audio signal, output a second audio signal generated based on the noise signal information through the speaker, determine a second frequency, based on the generated second audio signal, and change the operation frequency of the microphone to the second frequency and receive the external audio signal from outside of the electronic device through the microphone operating at the second frequency.

A method of outputting an audio signal by an electronic device including at least one microphone and at least one speaker includes configuring an operation frequency of the microphone as a first frequency and generating a first audio signal using an external audio signal received from outside of the electronic device through the microphone operating at the first frequency, acquiring noise signal information, based on the first audio signal, outputting a second audio signal generated based on the noise signal information through the speaker, determining a second frequency, based on the generated second audio signal, and changing the operation frequency of the microphone to the second frequency and receiving the external audio signal from outside of the electronic device through the microphone operating at the second frequency.

According to various embodiments, it is possible to improve the consumer usability through a decrease in power consumption and signal-to-noise ratio (SNR) performance advancement of a microphone by controlling a clock of the microphone of the electronic device according to a surrounding circumstance.

According to various embodiments, it is possible to reduce battery consumption in an aircraft, a bus, and the like in which noise is large and continuously generated by controlling the microphone of the electronic device according to an ANC operation condition.

According to various embodiments, it is possible to possible to reduce or remove noise generated by the microphone itself by controlling a clock in a space in which there is little noise such as an office or a library, thereby providing improved convenience to users.

BRIEF DESCRIPTION OF THE DRAWINGS

In connection with description of drawings, the same or similar reference numerals may be used for the same or similar elements.

The above and other aspects, features and advantages of certain embodiments of the present disclosure will be more apparent from the following detailed description, taken in conjunction with the accompanying drawings, in which.

DETAILED DESCRIPTION

Figure 1:
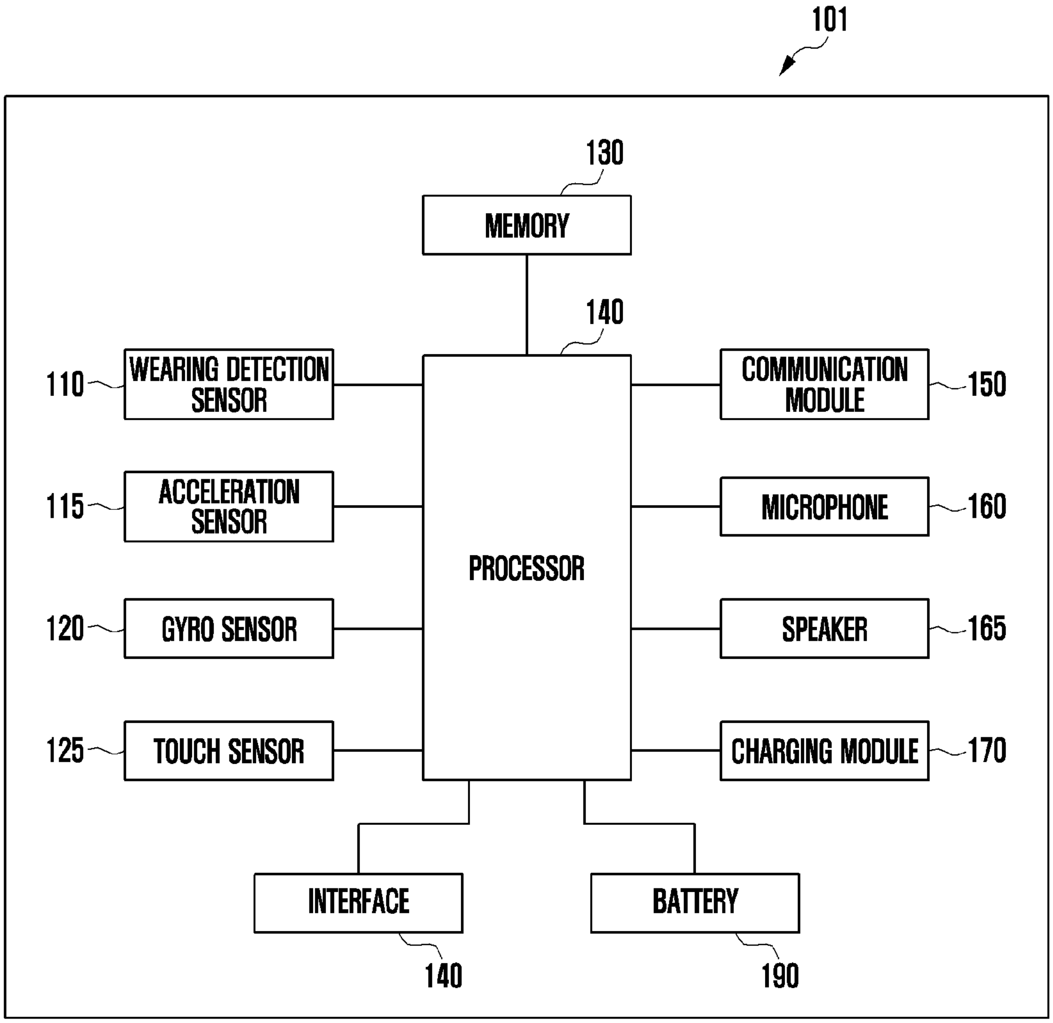
FIG. 1 is a block diagram of an example electronic device according to various embodiments.

FIG. 1 is a block diagram of an example electronic device according to various embodiments.

Referring to FIG. 1, an electronic device 101 may include at least one of a wearing detection sensor 110, an acceleration sensor 115, a gyro sensor 120, a touch sensor 125, a memory 130, a processor 140, a communication module 150, a microphone 160, a speaker 165, a charging module 170, an interface 180, or a battery 190. In various embodiments, the electronic device 101 may omit at least some of the elements shown in FIG. 1 or may additionally include one or more other elements. In various embodiments, some of the elements may be integrated into one element. The electronic device according to various embodiments of the disclosure may be a device in various forms and may include an audio device that outputs an audio signal. For example, the audio device may be wireless earphones or a hearing aid.

The wearing detection sensor 110 may, for example, be a sensor which detects an object approaching the electronic device 101. The wearing detection sensor 110 is used to determine whether the electronic device 101 is worn and may be disposed in an area of the electronic device 101 inserted into a user's ears. For example, the wearing detection sensor 110 may be a proximity sensor which determines whether an object approaches based on an amount of reflection of an infrared ray or a grip sensor (or a touch sensor) which determines whether an object approaches based on a change in an amount of an induced charge when the object is located nearby. The example of the wearing detection sensor 110 is only for providing an understanding of the disclosure, but the disclosure is not limited by this example.

The acceleration sensor 115 may, for example, be a sensor which measures acceleration of an object, vibration, or dynamic force such as impact. The acceleration sensor 115 may detect a state of motion of the object and may be used for various purposes. The electronic device 101 may determine whether the electronic device 101 is worn based on acceleration data measured by the acceleration sensor 115 along with the wearing detection sensor 110.

The gyro sensor 120 may, for example, be a sensor which measures an angular speed of the object. The gyro sensor 120 may measure the angular speed of the object unlike the acceleration sensor 115 which measure acceleration of the object. The angular speed may be a speed (or angle) of rotation per hour. The gyro sensor 120 may be used to determine whether the electronic device 101 is worn based on the angular speed of the electronic device 101. The gyro sensor 120 may also be referred to as a gyroscope sensor.

The touch sensor 125 may, for example, be a sensor for controlling the electronic device 101. When a touch is detected by the touch sensor 125 while the electronic device 101 outputs a sound, the electronic device 101 may stop sound reproduction. When a touch is detected by the touch sensor 125 after the reproduction is stopped, the electronic device 101 may start the sound reproduction. The touch sensor 125 may be disposed in an external area of the electronic device 101 that is not inserted into the user's ears in order to receive an input of a touch in a state in which the user wears the electronic device 101.

The memory 130 (or buffer) may store various pieces of data used by at least one element (for example, the processor 140 or the wearing detection sensor 110) of the electronic device 101. The data may include, for example, software (for example, a program(s)) and input data or output data for a command related thereto.

The processor 140 (e.g., including processing circuitry) may control at least one other element (for example, hardware or software component) of the electronic device 101 connected to the processor 140 by executing software and perform various data processing or calculations. According to an embodiment, as at least a portion of data processing or calculations, the processor 140 may store commands or data received from another element (for example, the wearing detection sensor 110 or the communication module 150) in the memory 130, process the command or data stored in the memory 130, and store resultant data in the memory 130. According to an embodiment, the processor 140 may include a main processor (for example, a central processing unit or an application processor) or an auxiliary processor (for example, a sensor hub processor or a communication processor) which can operate independently from or together with the main processor. For example, when the electronic device 101 includes the main processor and the auxiliary processor, the auxiliary processor may use lower power than the main processor may be configured to be specialized for a predetermined function. The auxiliary processor may be implemented as separate from the main processor or as part of the main processor.

According to various embodiments, when proximity of the object is detected by the wearing detection sensor 110, the processor 140 may collect gyro data from the gyro sensor 120 for a predetermined time, select sampling data based on the size of the collected gyro data, compare the selected sampling data with a reference value, and recognize the wearing state of the electronic device 101 based on the comparison result. The processor 140 may primarily determine the wearing state of the electronic device 101 through the wearing detection sensor 110 and secondarily determine the wearing state of the electronic device 101 through the gyro sensor 120, so as to more accurately recognize the wearing state of the electronic device 101.

According to various embodiments, the processor 140 may primarily determine the wearing state of the electronic device 101 through the wearing detection sensor 110, secondarily determine the wearing state of the electronic device 101 through the acceleration sensor 115, and tertiarily determine the wearing state of the electronic device 101 through the gyro sensor 120, so as to more accurately recognize the wearing state of the electronic device 101.

The communication module 150 (e.g., including communication circuitry) may establish a wireless communication channel with an external electronic device (for example, a smartphone or a notebook) and support the performance of communication through the established communication channel. The communication module 150 may be connected to an external electronic device through Bluetooth, Bluetooth low energy, Wi-Fi, adaptive network topology (ANT+), long-term evolution (LTE), $5^{th}$ generation mobile communication, (5G), or narrowband internet of things (NB-IoT) or may be connected to an access point or a network. The communication module 150 may receive a sound signal from the external electronic device or may transmit sensing information (or a sensing signal) or a sound signal to the external electronic device.

The microphone 160 may convert a sound into an electrical signal or inversely convert the electrical signal into the sound. According to an embodiment, the microphone 160 may acquire a sound (or audio) and convert the same into an electrical signal.

The speaker 165 may output an audio (or sound) signal to the outside of the electronic device 101. The speaker 165 may include a receiver. The speaker 165 may be used for a general purpose like reproduction of multimedia or reproduction of recorded data. The receiver may be used to receive an incoming call. According to an embodiment, the receiver may be implemented separately from the speaker 165 or as a part thereof.

The charging module 170 (e.g., including charging circuitry) may manage power supplied to the electronic device 101. The charging module 170 may charge the battery 190 with power received through the interface 180. The charging module 170 may be implemented as at least a part of a power management integrated circuit (PMIC).

Figure 2A:
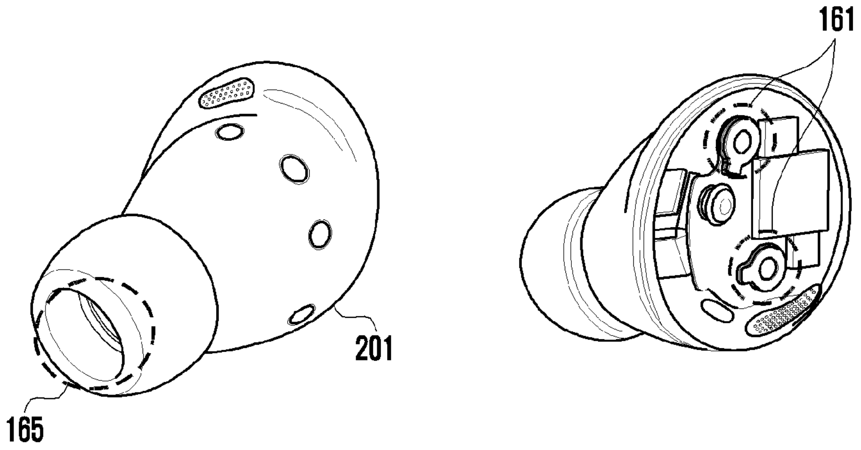
FIG. 2A, FIG. 2B, and FIG. 2C illustrate elements of the example electronic device according to various embodiments.

The interface 180 may include a connector through which the electronic device 101 can be physically connected to an external device (for example, the housing 201 of FIG. 2A).

The battery 190 may supply power to at least one element of the wearable device 101. According to an embodiment, the battery 190 may include, for example, non-rechargeable primary cell, a rechargeable secondary cell, or a fuel cell.

Figure 2B:
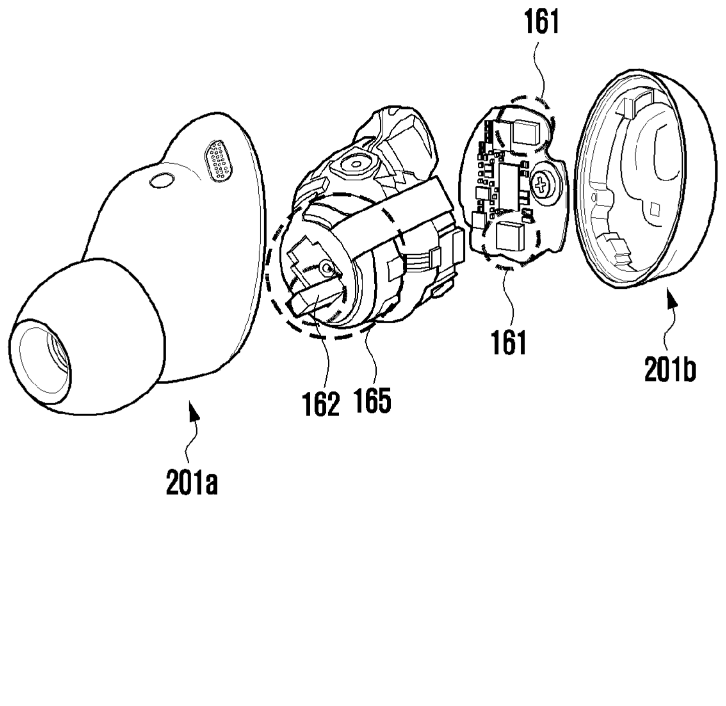
Figure 2C:
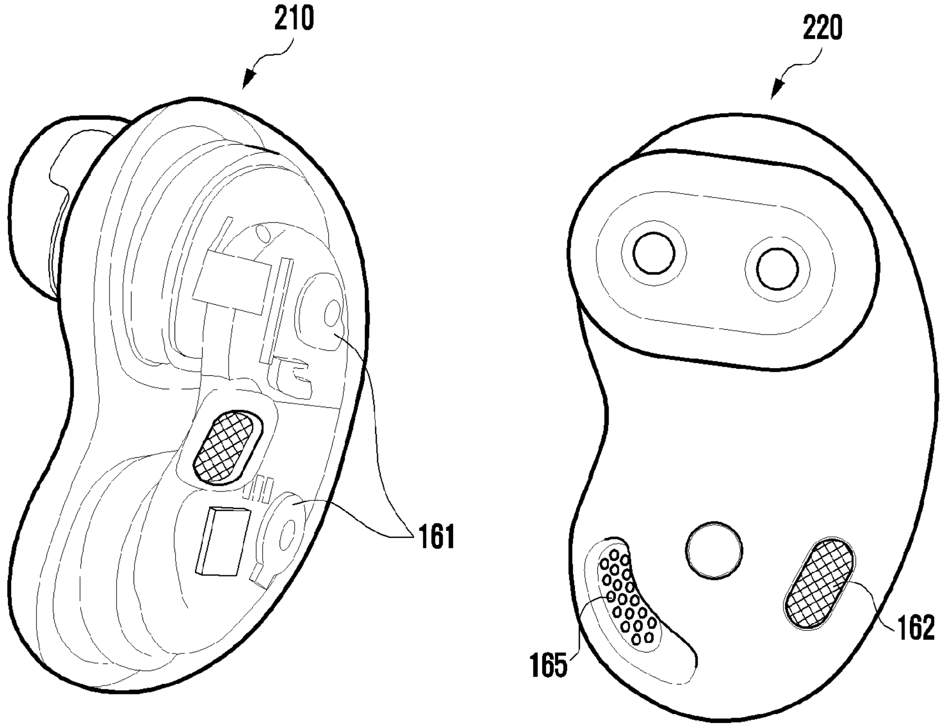

FIG. 2A, FIG. 2B, and FIG. 2C illustrate elements of the example electronic device according to various embodiments.

FIG. 2A illustrates a first form of an example electronic device (for example, the electronic device 101 of FIG. 1). The electronic device 101 in the first form may include canal-type earphones.

FIG. 2B is an exploded perspective view of the example electronic device 101 in the first form illustrated in FIG. 2A.

FIG. 2C illustrates a second form of the example electronic device 101. The electronic device 101 in the second form may include open-type earphones.

Referring to FIG. 2A, FIG. 2B, and FIG. 2C, an electronic device (for example, a first device 210 and/or a second device 220) (for example, the electronic device 101 of FIG. 1) according to various embodiments may be a device wirelessly connected to an external electronic device (for example, a smartphone) and configured to receive an audio signal output from the external electronic device and output the audio signal through the speaker 165 (for example, the speaker 165 of FIG. 1) or transmit an audio signal input from the outside (for example, a user) through a microphone (for example, a first microphone 161 and/or a second microphone 162) (for example, the microphone 160 of FIG. 1) to the external electronic device. The electronic device 101 may include at least one of the first device 210 and the second device 220 which are two devices substantially the same or symmetrical to each other. Hereinafter, the electronic device 101 described in the disclosure may be the first device 210 or the second device 220. According to an embodiment, the first microphone 161 may be disposed to face a direction substantially opposed to or different from a sound output direction of the speaker 165. For example, the first microphone 161 may not receive an audio signal output from the speaker 165 or may receive an audio signal at a level substantially close to 0. According to an embodiment, the second microphone 162 may be disposed to face a direction substantially the same as or similar to a sound output direction of the speaker 165. For example, the second microphone 162 may receive an audio signal output from the speaker 165 at a level substantially the same as the output level. According to an embodiment, the first microphone 161, the second microphone 162, and/or the speaker 165 may be included in the housing 201. According to an embodiment, the housing 201 may include a first housing 201*a* and a second housing 201*b*.

In an embodiment, the first device 210 and the second device 220 may be worn on a part of a user's body (for example, a left ear of the user or a right ear of the user). Each of the first device 210 and the second device 220 may include a speaker or a microphone. Each of the first device 210 and the second device 220 may output an audio signal through the speaker 165 or receive (or input) an audio signal from the outside the device through the microphone (for example, the first microphone 161 and/or the second microphone 162).

According to various embodiments, the first device 210 may serve as a master and the second device 220 may serve as a slave. In an embodiment, the first device 210 may serve as a slave and the second device 220 may serve as a master. The first device 210 and the second device 220 may periodically and/or successively receive an audio signal to be output to the speaker 165 from the external electronic device.

Figure 3:
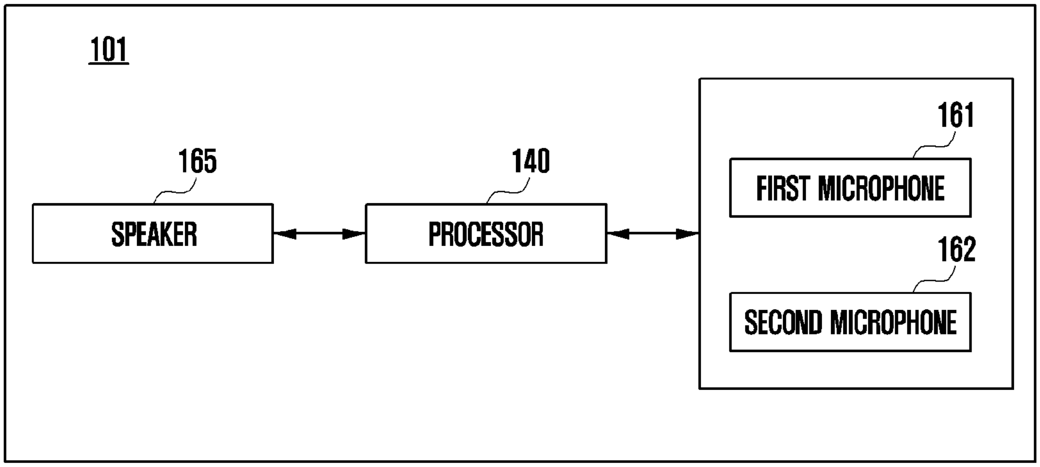
FIG. 3 is a block diagram of the example electronic device according to various embodiments.

FIG. 3 is a block diagram of the example electronic device according to various embodiments.

Referring to FIG. 3, the electronic device 101 (for example, the electronic device 101 of FIG. 1) may include the speaker 165 (for example, the speaker 165 of FIG. 1), the processor 140, or at least one microphone (for example, the first microphone 161, the second microphone 162, and the microphone 160 of FIG. 1).

According to various embodiments, at least one microphone may include the first microphone 161 and/or the second microphone 162. The electronic device 101 may include at least one of the first microphone 161 and the second microphone 162. According to various embodiments, at least one microphone may receive an external sound. According to an embodiment, at least one microphone may convert an external audio signal into an electrical signal. At this time, the external audio signal may include an audio signal outside the electronic device 101. The external audio signal may include a signal obtained such that external noise or a sound made within the electronic device 101 is transmitted to the outside and then received through at least one microphone. At least one microphone may receive the external audio signal from the processor 140 based on a predetermined operation frequency. The operation frequency of the microphone may be a clock speed of the microphone. For example, the operation frequency may be a speed at which digitized data (for example, a first audio signal) of an external audio signal (which is an analog signal) is recorded using the microphone. The clock speed may be a number of clock pulses generated per hour and may be referred to, for example, as a clock frequency. The electronic device 101 may generate an electrical signal related to an external audio signal received at predetermined intervals corresponding to the predetermined operation frequency through at least one microphone. For example, at least one microphone may convert the external audio signal received according to a predetermined internal frequency corresponding to a predetermined operation frequency into an electrical signal and transmit the converted electrical signal to the processor 140. According to an embodiment, the first microphone 161 may receive an audio signal outside the electronic device 101 except for the audio signal generated outside the electronic device 101, for example, by the audio signal output from the speaker 165. According to an embodiment, the second microphone 162 may receive the audio signal generated outside the electronic device 101. According to an embodiment, at least one microphone may include a digital microphone.

According to various embodiments, the speaker 165 may output the audio signal to the outside of the electronic device 101. According to an embodiment, the speaker 165 may receive an electrical signal related to the audio signal to be output from the processor 140 and convert the received electrical signal into an audio signal.

According to various embodiments, the processor 140 may process calculations or data related to the control and/or communication of each element of the electronic device 101. The processor 140 may include at some of the elements and/or functions of the processor 140 of FIG. 1. The processor 140 may be operatively, electrically, and/or functionally connected to the elements of the electronic device 101 such as the speaker 165, the first microphone 161, and/or the second microphone 162. There is no limitation on the type and/or the amount of operations, calculations, and data processing which can be performed by the processor 140, and the disclosure describes the configuration and the function of the processor 140 related to a noise canceling method of the electronic device 101 and an operation for performing the method according to various embodiments.

According to various embodiments, the processor 140 may receive an external audio signal from at least one microphone (for example, the first microphone 161 and/or the second microphone 162). According to an embodiment, the processor 140 may receive a signal electrically converted from an external audio signal, which is received by at least one microphone, from at least one microphone. At this time, the external audio signal may include an audio signal outside the electronic device 101. The audio signal (external audio signal) outside the electronic device 101 may include noise (for example, a first external audio signal) generated outside an ear (for example, external to the ear) of a user wearing the electronic device 101. For example, the processor 140 may receive the audio signal (for example, the first external audio signal) outside the electronic device 101 by controlling the first microphone 161. According to an embodiment, the external audio signal may include a signal obtained such that external noise and a sound (e.g., sound generated by electronic device 101 and output through speaker 165) are transmitted to the outside of the electronic device 101 and then received through at least one microphone. For example, the external audio signal may include all audio signals (for example, a second external audio signal) transmitted to the inside of the user's ear (for example, internal ear) wearing the electronic device 101 among the external sounds of the electronic device 101. Accordingly, among the audio signal output by the speaker device 165, noise (for example, hiss noise) generated by the electronic device 101, and/or noise (for example, the first external audio signal) generated outside the electronic device 101, all audio signals (for example, the first external audio signal or the second external audio signal) transmitted through a physical sound insulation effect of the electronic device 101 may be included. According to an embodiment, the processor 140 may receive the audio signal (for example, the second external audio signal) transmitted to the internal ear of the user among external audio signals outside the electronic device 101 by controlling the second microphone 162. According to an embodiment, the processor 140 may configure an operation frequency of at least one microphone and control at least one microphone to receive an external audio signal based on the configured operation frequency. According to an embodiment, the processor 140 may change the operation frequency of the microphone. The processor 140 may receive an electrical signal related to the external audio signal generated according to predetermined intervals corresponding to the predetermined operation frequency through at least one microphone. According to an embodiment, the processor 140 may configure different operation frequencies by controlling the first microphone 161 and the second microphone 162. According to an embodiment, the processor 140 may configure the operation frequencies all together by simultaneously controlling the first microphone 161 and the second microphone 162.

According to various embodiments, the processor 140 may generate a first audio signal based on the received external audio signal. According to an embodiment, the first audio signal may include conversion of the external audio signal into a digital signal. According to an embodiment, the first audio signal may include a signal obtained by amplifying the external audio signal through an amplifier (for example, pre amplifier) and converting the external audio signal into a digital signal. According to an embodiment, the processor 140 may generate the first audio signal based on the signal (for example, a first digital signal) obtained by processing the first external audio signal and the signal (for example, the second digital signal) obtained by processing the second external audio signal. For example, it is possible to generate the first audio signal by combining the signal obtained by amplifying and digitally-converting the first external audio signal and the signal obtained by amplifying and digitally-converting the second external audio signal. The external audio signal may include, for example, the first external audio signal or the second external audio signal. According to an embodiment, the processor 140 may generate the first audio signal by processing the external audio signal. According to an embodiment, the first audio signal may include a signal obtained by converting the external audio signal from an analog signal into a digital signal by an analog-digital converter (ADC). The ADC may be disposed outside the processor 140 in the form of an integrated circuit and may include a circuit electrically connected to the processor 140 or may be included in the processor 140. According to an embodiment, the processor 140 may generate a first audio signal by controlling the ADC to convert the external audio signal into the digital signal. The first audio signal may include a signal (for example, a first digital signal) converted from the first external audio signal and a signal (for example, a second digital signal) converted from the second external audio signal.

According to various embodiments, the processor 140 may acquire noise signal information based on the first audio signal. The noise signal information may include a signal related to a sound among external sounds. According to an embodiment, the noise signal information may include at least some of the first audio signal. According to an embodiment, the noise signal information may include a signal within a predetermined frequency band range among the first audio signals. According to an embodiment, the processor 140 may generate noise signal information based on information on the first audio signal generated by reception of an external sound through at least one microphone and an audio signal output by the speaker 165. According to an embodiment, the processor 140 may generate the noise signal information based on the first audio signal generated by adding a signal (for example, a first digital signal 413) converted from the first external audio signal and a signal (for example, a second digital signal 414) converted from the second external audio signal. According to an embodiment, the processor 140 may generate the noise signal information by applying a predetermined signal processing scheme to the first audio signal. For example, the processor 140 may generate the noise signal information by passing the first audio signal through one or more predetermined filters. The processor 140 may generate the noise signal information by modulating, amplifying, and/or attenuating the first audio signal. According to an embodiment, the processor 140 may generate the noise signal information by applying different filters to the signal (for example, the first digital signal 413 in FIG. 4) converted from the first external audio signal and the signal (for example, the second digital signal 414 in FIG. 4) converted from the second external audio signal. According to an embodiment, the processor 140 may generate the noise signal information by adding inverse phase signals of the audio signals (for example, the second audio signals) output by the electronic device 101 for the second external audio signals.

According to various embodiments, the processor 140 may generate and output a second audio signal based on the noise signal information. According to an embodiment, the processor 140 may generate the second audio signal by processing the noise signal information. The second audio signal may be a signal for removing a noise signal. For example, the processor 140 may inverse-phase process the noise signal information and apply filtering, amplification, attenuation, and/or modulation to the noise signal information or the inverse-phase signal of the noise signal information. According to an embodiment, the processor 140 may generate the second audio signal for attenuating the noise signal based on the noise signal information. According to an embodiment, the second audio signal may include an audio signal having substantially the same amplitude as the noise signal and a phase opposite thereto. According to an embodiment, the processor 140 may output the second audio signal by controlling the speaker 165. According to an embodiment, the processor 140 may output the second audio signal simultaneously with audio data (for example, sound source data or call voice data) other than the second audio signal to remove noise.

According to various embodiments, the processor 140 may determine an operation frequency of the microphone (for example, the first microphone 161 and/or the second microphone 162) based on the second audio signal. According to an embodiment, the processor 140 may determine the operation frequency of the microphone by analyzing the generated second audio signal. For example, the processor 140 may determine the operation frequency of the microphone based on a gain value of the second audio signal. The gain of the second audio signal may be identified through an output gain of the speaker 165 controlled by the processor 140. According to an embodiment, the processor 140 determines the operation frequency of the microphone based on the gain of the speaker 165. According to an embodiment, the processor 140 may reduce the operation frequency of the microphone when the gain of the second audio signal increases. When a level of the noise signal is high, a signal-to-noise ratio (SNR) value may have a positive correlation with the level of the noise signal, and the noise signal may be effectively received even though the microphone is controlled by a low operation frequency. On the other hand, when the level of the noise signal is low, the SNR value of the noise signal may be low. In this case, it is possible to effectively receive a signal with a low SNR by controlling the microphone by a higher operation frequency. According to an embodiment, the processor 140 may increase the microphone operation frequency when the level of the second audio signal decreases. According to an embodiment, the processor 140 may identify a gain of the second audio signal and determine the microphone operation frequency based on the identified gain.

According to various embodiments, the processor 140 may change the operation frequency of the microphone (for example, the first microphone 161 and/or the second microphone 162) to the operation frequency determined based on the second audio signal. According to an embodiment, when the operation frequency of the microphone determined based on the second audio signal is different from the configured or the current microphone operation frequency, the processor 140 may change the operation frequency to the determined operation frequency. According to an embodiment, the processor 140 may receive an external audio signal by controlling the microphone (for example, the first microphone 161 and/or the second microphone 162) according to the changed operation frequency.

According to an embodiment, the processor 140 may identify the gain of the speaker 165 when the operation frequency of the microphone achieves a predetermined maximum operation frequency. For example, the processor 140 may identify whether the gain of the speaker 165 has a value of 0 or a value substantially corresponding to 0. The processor 140 may identify whether the gain of the speaker 165 converges to 0 based on whether the gain of the speaker 165 is smaller than a predetermined threshold value.

According to an embodiment, when it is identified that the gain of the speaker 165 converges to 0, the processor 140 may store a level of the external audio signal at the corresponding time point. For example, the processor 140 may identify that the gain of the speaker 165 is substantially 0 and store the level value of the external audio signal acquired through the first microphone 161 and/or the second microphone 162 in a memory (for example, the memory 130 of FIG. 1).

According to an embodiment, the processor 140 may deactivate the speaker 165 when it is identified that the gain of the speaker 165 converges to 0.

According to an embodiment, when the gain of the second audio signal converges to 0, the processor 140 may store the level value of the external audio signal acquired through the microphone and deactivate the speaker 165.

According to an embodiment, when the gain of the second audio signal converges to 0, the processor 140 may return the operation frequency of the microphone to the original value from the changed operation frequency based on the second audio signal. For example, the original value may be a predetermined default operation frequency.

According to an embodiment, when a level of a newly received external audio signal is larger than a predetermined threshold value based on the level of the external audio signal stored when the gain of the second audio signal converges to 0, the processor 140 may reactivate the deactivated speaker 165. According to an embodiment, the processor 140 may identify whether the level of the newly received external audio signal is larger than a predetermined threshold value based on a root mean square (RMS) value of the newly received external audio signal. According to an embodiment, the processor 140 may identify the RMS value of the level of the newly received external audio signal in a predetermined frequency (for example, audible frequency) band range. The processor 140 may identify whether the identified RMS value is larger than a predetermined threshold value. According to an embodiment, the processor 140 may reactivate the speaker 165 based on whether RMS values of some of the external audio signals including the predetermined frequency band are larger than the predetermined threshold value among the received external audio signals.

Figure 4:
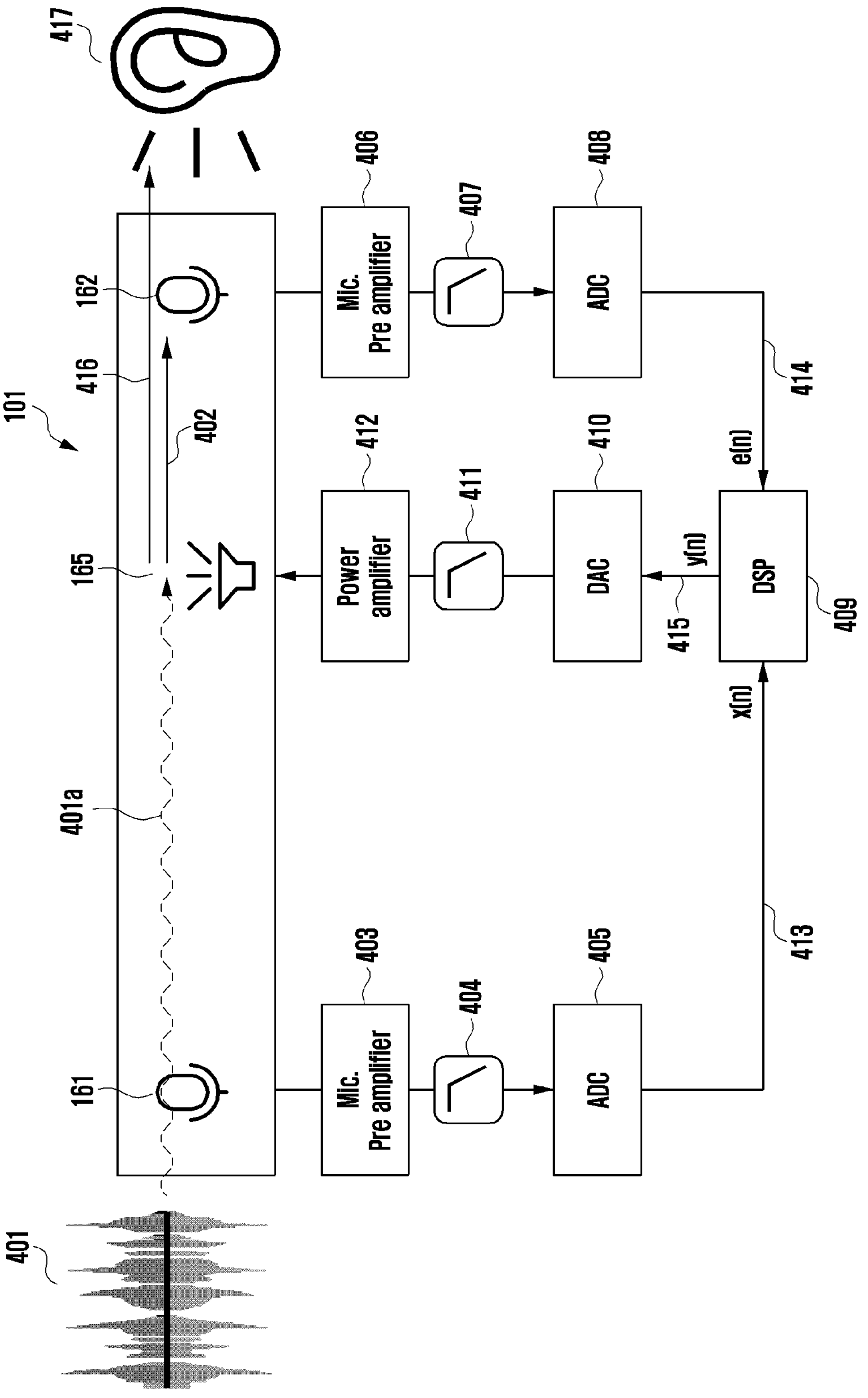
FIG. 4 illustrates an operation in which the example electronic device removes external noise according to various embodiments.

FIG. 4 illustrates an operation in which the example electronic device removes external noise according to various embodiments.

Referring to FIG. 4, the electronic device 101 (for example, the electronic device 101 of FIG. 1 or the electronic device 101 of FIG. 3) may include the first microphone 161, the second microphone 162, and/or the speaker 165.

According to various embodiments, the electronic device 101 may receive an external audio signal (for example, the first external audio signal 401) from the first microphone 161. According to an embodiment, the electronic device 101 may receive the first external audio signal 401 through the first microphone 161 to receive an electrically converted signal (for example, the first digital signal 413). At this time, the first external audio signal 401 may include an audio signal outside the electronic device 101. The outside of the electronic device 101 may include noise generated outside an ear 417 of a user wearing the electronic device 101.

According to various embodiments, the electronic device 101 may receive the second external audio signal 402. According to an embodiment, the electronic device 101 may receive an audio signal (for example, the second external audio signal 402) transmitted to an internal ear of the user among the external audio signals outside the electronic device 101 by controlling the second microphone 162. According to an embodiment, the external audio signal may include a signal obtained after external noise and a sound generated inside the electronic device 101 are transmitted to the outside of the electronic device 101 and are received through at least one microphone. For example, the external audio signals may include all audio signals (for example, the second external audio signal) transmitted to the inside of the ear 417 of the user wearing the electronic device 101 among the sounds outside the electronic device 101. Accordingly, all of the audio signals **401*a* transmitted through a physical sound insulation effect of the electronic device 101 may be included among audio signals output from the speaker device 165, sounds (for example, hiss noise) generated by the electronic device 101, and/or noise (for example, the first external audio signal 401) generated outside the electronic device 101. According to an embodiment, the second external audio signal 402 may include noise obtained after the second audio signal 416 and the first external audio signal 401 output from the speaker 165 are passively cancelled by the physical structure of the electronic device 101 and transmitted to the user's ears 417. For example, the second external audio signal 402 may include an audio signal which is substantially the same as a sound to which the user actually listens. According to an embodiment, the second external audio signal 402 may include a signal obtained by feeding back a signal (for example, the second audio signal 416) for cancelling at least some of the noise by the first external audio signal 401 to the electronic device 101**.

According to various embodiments, the electronic device 101 may generate the first audio signal based on the first external audio signal 401 and/or the second audio signal 402. According to an embodiment, the first audio signal may include conversion (for example, the first digital signal 413) of the first external audio signal 401 into a digital signal. According to an embodiment, the first audio signal may include a signal (for example, the first digital signal 413) obtained after the first external audio signal 401 is amplified through a first amplifier 403 (mic. Pre amplifier) and then converted into a digital signal. According to an embodiment, the first audio signal may include a signal (for example, the second digital signal 414) obtained after the second external audio signal 402 is amplified through a second amplifier 406 (mic. pre amplifier) and then converted into a digital signal. According to an embodiment, the first audio signal may include a signal (for example, the first digital signal 413) converted from the first external audio signal 401 through a filter (for example, a first filter 404). According to an embodiment, the first audio signal may include a signal (for example, the second digital signal 414) converted from the second external audio signal 402 through a filter (for example, the second filter 407). According to an embodiment, the electronic device 101 may generate the first audio signal by combining the signal (for example, the first digital signal 413) converted from the first external audio signal and the signal (for example, the second digital signal 414) converted from the second external audio signal. According to an embodiment, the electronic device 101 may generate the first audio signal by processing the external audio signal. According to an embodiment, the first audio signal may be include a signal (for example, the first digital signal 413) obtained after the first external audio signal 402 is converted from an analog signal into a digital signal through an ADC (for example, a first ADC 405) and/or a signal (for example, the second digital signal 414) obtained after the second external audio signal 402 is converted from an analog signal into a digital signal through an ADC (for example, a second ADC 408). The ADC may be disposed within the electronic device 101 in the form of an integrated circuit and may include a circuit electrically connected to the electronic device 101 or may be included within a processor (for example, the processor 140 of FIG. 3) of the electronic device 101. According to an embodiment, the electronic device 101 may generate the first audio signal by controlling the ADC (for example, the first ADC 405 and/or the second ADC 408) to convert the external audio signal (for example, the first external audio signal 401 and/or the second external audio signal 402) into the digital signal. According to an embodiment, the electronic device 101 may generate the first audio signal by adding the signal (for example, the first digital signal 413 converted from the first external audio signal and the signal (for example, the second digital signal 414) converted from the second external audio signal.

The electronic device 101 may perform processing such as combining, analyzing, or converting various audio signals by controlling the DSP 409. According to an embodiment, the electronic device 101 may generate a first audio signal by controlling the digital signal processor (DSP) 409. The DSP 409 may be a part of the processor (for example, the processor 140 of FIG. 3) or may be electrically connected to the processor 140 in the form of an integrated circuit disposed outside the processor 140. According to an embodiment, the electronic device 101 may generate the first audio signal by combining the signal (for example, the first digital signal 413) generated by the first external audio signal 401 and the signal (for example, the second digital signal 414) generated by the second external audio signal 402.

According to an embodiment, the electronic device 101 may configure an operation frequency of at least one first microphone 161 and control at least one first microphone 161 to receive an external audio signal based on the configured operation frequency. According to an embodiment, the electronic device 101 may change the operation frequency of the first microphone 161. The operation frequency of the first microphone 161 may refer, for example, to a clock speed of the first microphone 161. For example, the operation frequency may be a speed at which digitized data (for example, the first digital signal 413) of the first external audio signal 401 is recorded through the first microphone 161. The clock speed may be a number of a clock pulse generated per hour and may be referred to as a clock frequency. The electronic device 101 may generate an electrical signal related to an external audio signal received at predetermined intervals corresponding to the predetermined operation frequency through at least one first microphone 161. According to an embodiment, the operation frequency may be a speed at which the ADC (for example, the first ADC 405) records the first external audio signal 401 as the digital signal. The electronic device 101 may generate a plurality of digital signals (for example, the first digital signals 413) at a speed corresponding to the operation frequency by controlling the first ADC 405 based on the operation frequency.

According to an embodiment, the electronic device 101 may configure the operation frequency of at least one second microphone 162 and control at least one second microphone 162 to receive an external audio signal based on the configured operation frequency. According to an embodiment, the electronic device 101 may change the operation frequency of the second microphone 162. The operation frequency of the second microphone 162 may refer, for example, to a clock speed of the second microphone 162. For example, the operation frequency may be a speed at which digitized data (for example, the second digital signal 414) of the second external audio signal 402 is recorded through the second microphone 162. The clock speed may be a number of a clock pulse generated per hour and may be referred to as a clock frequency. The electronic device 101 may control at least one second microphone 162 to receive an electrical signal related to an external audio signal received according to the predetermined operation frequency. According to an embodiment, the operation frequency may be a speed at which the ADC (for example, second ADC 408) records the second external audio signal 402 as the digital signal. The electronic device 101 may generate a plurality of digital signals (for example, second digital signals 414) at a speed corresponding to the operation frequency by controlling the second ADC 408 based on the operation frequency.

According to an embodiment, the electronic device 101 may configure different operation frequencies by controlling the first microphone 161 and the second microphone 162. According to an embodiment, the electronic device 101 may configure the same operation frequency in the respective microphones by simultaneously controlling the first microphone 161 and the second microphone 162.

According to various embodiments, the electronic device 101 may acquire noise signal information 415. According to an embodiment, the electronic device 101 may acquire the noise signal information 415 based on a first audio signal. The noise signal information 415 may include a signal related to noise in the external sounds. According to an embodiment, the noise signal information 415 may include at least some of the first audio signal. According to an embodiment, the noise signal information 415 may include a signal within a predetermined frequency band range among the first audio signals. According to an embodiment, the electronic device 101 may control the DSP 409 to generate the noise signal information 415 based on the first audio signal. According to an embodiment, the electronic device 101 may generate the first audio signal by adding the first digital signal 413 generated based on the first external audio signal 401 and the second digital signal 414 generated based on the second external audio signal and generate the noise signal information 415 based on the first audio signal. According to an embodiment, the electronic device 101 may generate the noise signal information 415 by applying a predetermined signal processing scheme to the first audio signal through the control of the DSP 409. For example, the electronic device 101 may generate the noise signal information 415 by passing the first audio signal through one or more predetermined filters. The electronic device 101 may generate the noise signal information 415 by modulating, amplifying, and/or attenuating the first audio signal. According to an embodiment, the electronic device 101 may generate the noise signal information 415 by applying different filters to the first digital signal 413 based on the first external audio signal 401 and the second digital signal 414 based on the second external audio signal 402. According to an embodiment, the electronic device 101 may generate the noise signal information 415 by adding inverse phase signals of audio signals (for example, sound sources) which the electronic device 101 is to output other than the second audio signal with respect to the second external audio signal 402.

According to various embodiments, the electronic device 101 may generate and output a second audio signal 416 based on the noise signal information 415. According to an embodiment, the electronic device 101 may generate a second audio signal 416 by processing the noise signal information 415. The second audio signal 416 may be a signal for removing noise. For example, the electronic device 101 may inverse-phase process the noise signal information 415, filter the noise signal information 415 or an inverse phase signal of the noise signal information 415 by applying a filter (for example, a third filter 411) thereto, amplify the same through an amplifier (for example, a third amplifier 412) (power amplifier), and attenuate and/or modulate the same. According to an embodiment, the electronic device 101 may generate the second audio signal 416 for attenuating a noise signal based on the noise signal information 415. According to an embodiment, the second audio signal 416 may include an audio signal having amplitude substantially the same as the noise signal and having a phase opposite thereto. According to an embodiment, the electronic device 101 may output the second audio signal 416 by controlling a speaker (for example, the speaker 165 of FIG. 3). According to an embodiment, the electronic device 101 may generate and output the second audio signal 416 based on the noise signal information 415. The electronic device 101 may determine a level of the second audio signal based on the noise signal information 415. For example, the electronic device 101 may generate the second audio signal 416 at a level corresponding to the size of noise included in the external audio signal based on the noise signal information 415. The electronic device 101 may output the second audio signal 416 by performing amplification by a gain of the level corresponding to the noise signal information 415 through the control of the third amplifier 412.

Figure 5:
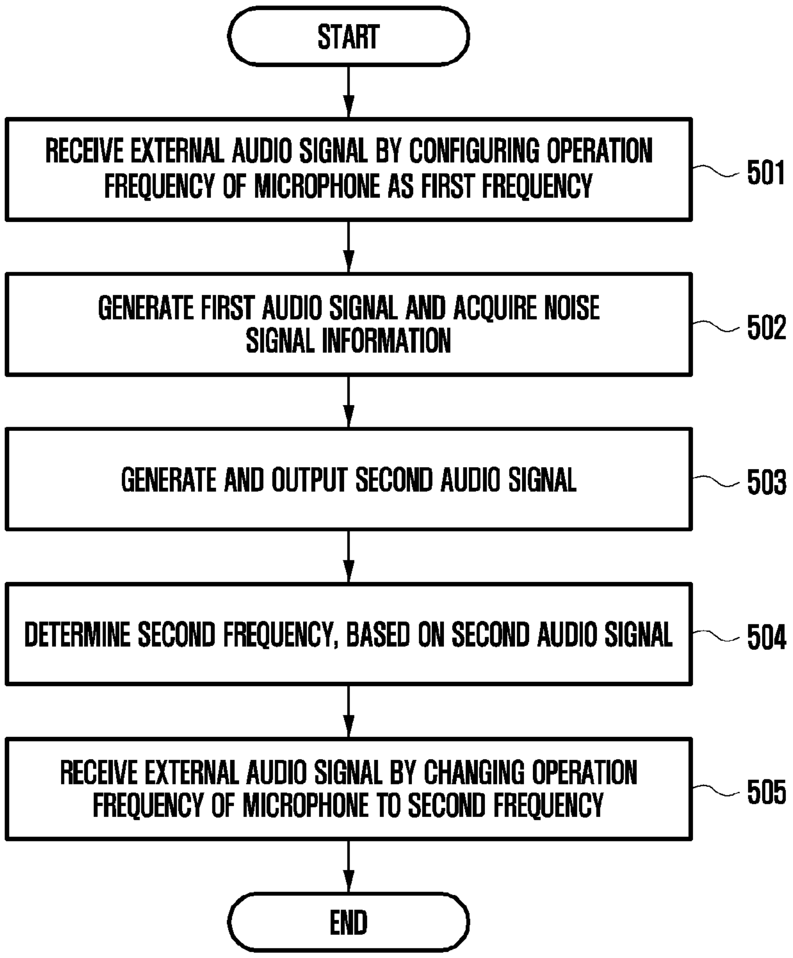
FIG. 5 is a flowchart illustrating an operation in which the example electronic device removes external noise according to various embodiments.

FIG. 5 is a flowchart illustrating an operation in which the example electronic device removes external noise according to various embodiments.

Referring to FIG. 5, an operation in which the electronic device (for example, the electronic device 101 of FIG. 1 or the electronic device 101 of FIG. 3) removes external noise may include a series of operations performed by a processor (for example, the processor 140 of FIG. 1 or the processor 140 of FIG. 3) of the electronic device. Some of the respective operations of FIG. 5 may be changed, exchanged, or replaced with other operations.

In operation 501, the processor 140 may configure an operation frequency of the microphone (for example, the first microphone 161 and/or the second microphone 162 of FIG. 3) as a first frequency and receive an external audio signal. According to various embodiments, the processor 140 may receive the external audio signal from at least one microphone (for example, the first microphone 161 and/or the second microphone 162 of FIG. 3). According to an embodiment, the processor 140 may receive the external audio signal by at least one microphone and receive an electrically converted signal from at least one microphone. At this time, the external audio signal may include an audio signal outside the electronic device 101. The outside of the electronic device 101 may include noise (for example, the first external audio signal) generated outside an ear (for example, external ear) of a user wearing the electronic device 101. For example, the processor 140 may receive an audio signal (for example, a first external audio signal) outside the electronic device 101 by controlling the first microphone 161. According to an embodiment, the external audio signal may include a signal (for example, a second external voice signal) obtained after external noise and a sound generated inside the electronic device 101 are transmitted to the outside of the electronic device 101 and received again through at least one microphone (for example, the second microphone 162). For example, the external audio signal may include all audio signals (for example, second external audio signals) transmitted to the inside of a user's ear (for example, internal ear) wearing the electronic device 101 among sounds outside the electronic device 101. For example, the second external audio signal may include all audio signals transmitted through a physical sound insulation effect of the electronic device 101 among audio signals output from the speaker 165, noise (for example, hiss noise) generated by the electronic device 101, and/or noise (for example, the first external audio signal) generated outside the electronic device 101. According to an embodiment, the processor 140 may configure an operation frequency (for example, a first frequency) of at least one microphone and control at least one microphone to generate the external audio signal based on the configured operation frequency. The processor 140 may receive an electrical signal related to the external audio signal generated according to predetermined intervals corresponding to the predetermined operation frequency by at least one microphone. The first frequency may be, for example, an initially configured value for the operation frequency. According to an embodiment, the processor 140 may configure different operation frequencies by controlling the first microphone 161 and the second microphone 162. According to an embodiment, the processor 140 may configure the operation frequencies all together by simultaneously controlling the first microphone 161 and the second microphone 162.

In operation 502, the processor 140 may generate a first audio signal and acquire noise signal information. According to various embodiments, the processor 140 may generate the first audio signal based on the received external audio signal. According to an embodiment, the first audio signal may include conversion of the external audio signal into a digital signal. According to an embodiment, the first audio signal may include a signal obtained by amplifying the external audio signal through an amplifier (for example, pre amplifier) and converting the same into a digital signal. According to an embodiment, the processor 140 may generate the first audio signal by combining the first external audio signal and the second external audio signal. According to an embodiment, the processor 140 may generate the first audio signal by processing the external audio signal. According to an embodiment, the first audio signal may include a signal obtained by converting the external audio signal from an analog signal into a digital signal by an analog-to-digital converter (ADC). The ADC may be disposed outside the processor 140 in the form of an integrated circuit and may include a circuit electrically connected to the processor 140 or may be included within the processor 140. According to an embodiment, the processor 140 may generate the first audio signal by converting the external audio signal into a digital signal through the control of the ADC. The first audio signal may include the first external audio signal and the second external audio signal. According to various embodiments, the processor 140 may acquire noise signal information based on the first audio signal. The noise signal information may include a signal related to noise among external sounds. According to an embodiment, the noise signal information may include the first audio signal. According to an embodiment, the noise signal information may include a signal within a predetermined frequency band range among the first audio signals. According to an embodiment, the processor 140 may generate the noise signal information based on the first audio signal generated through reception of the external sound using at least one microphone and information on the audio signal output by the speaker 165. According to an embodiment, the processor 140 may generate the noise signal information by adding the first audio signal generated based on the first external audio signal and the second audio signal generated based on the second external audio signal. According to an embodiment, the processor 140 may generate the noise signal information by applying a predetermined signal processing scheme to the first audio signal. For example, the processor 140 may generate the noise signal information by passing the first audio signal through one or more predetermined filters. The processor 140 may generate the noise signal information by modulating, amplifying, and/or attenuating the first audio signal. According to an embodiment, the processor 140 may generate the noise signal information by applying different filters to first audio information based on the first external audio signal and the second audio information based on the second external audio signal. According to an embodiment, the processor 140 may generate the noise signal information by adding inverse phase signals of the audio signals (for example, the second audio signals) output by the electronic device 101 for the second external audio signals.

In operation 503, the processor 140 may generate and output the second audio signal. According to various embodiments, the processor 140 may generate and output the second audio signal based on the noise signal information. According to an embodiment, the processor 140 may generate the second audio signal by processing the noise signal information. The second audio signal may be a signal for removing the noise signal. For example, the processor 140 may inverse-phase process the noise signal information and apply filtering, amplification, attenuation, and/or modulation to the noise signal information or the inverse phase signal of the noise signal information. According to an embodiment, the processor 140 may generate the second audio signal for attenuating the noise signal based on the noise signal information. According to an embodiment, the second audio signal may include an audio signal having amplitude substantially the same as the noise signal and having a phase opposite thereto. According to an embodiment, the processor 140 may output the second audio signal by controlling a speaker (for example, the speaker 165 of FIG. 3).

In operation 504, the processor 140 may determine a second frequency based on the second audio signal. According to various embodiments, the processor 140 may determine an operation frequency of the microphone (for example, the first microphone 161 and/or the second microphone 162 of FIG. 3) based on the second audio signal. According to an embodiment, the processor 140 may determine the operation frequency of the microphone by analyzing the generated second audio signal. For example, the processor 140 may determine the operation frequency of the microphone based on a gain value of the second audio signal. The gain of the second signal may be identified through an output gain of the speaker (for example, the speaker 165 of FIG. 3) controlled by the processor 140. According to an embodiment, the processor 140 may determine the operation frequency of the microphone based on the gain of the speaker 165. According to an embodiment, when the gain of the second audio signal increases, the processor 140 may reduce the operation frequency of the microphone. When a level of the noise signal is high, a signal-to-noise ratio (SNR) value may have a positive correlation with the level of the noise signal, and the processor 140 may receive the noise signal by controlling the microphone with a low operation frequency. On the other hand, when the level of the noise signal is low, the SNR value of the noise signal may be very small. In this case, the processor 140 may receive the signal having a low SNR by controlling the microphone with a higher operation frequency. According to an embodiment, the processor 140 may increase the operation frequency of the microphone when the level of the second audio signal is received. Here, the 'level' of the audio signal may be the size of the audio signal or the volume of the audio signal. According to an embodiment, the processor 140 may identify the gain of the second audio signal and determine the operation frequency of the microphone based on the identified gain.

In operation 505, the processor 140 may change the operation frequency of the microphone into the second frequency and receive the external audio signal. According to various embodiments, the processor 140 may change the operation frequency of the microphone (for example, the first microphone 161 and/or the second microphone 162 of FIG. 3) into the determined operation frequency based on the second audio signal. According to an embodiment, when the operation frequency of the microphone determined based on the second audio signal is different from the configured or current microphone operation frequency, the processor 140 may change the operation frequency into the determined operation frequency. According to an embodiment, the processor 140 may receive the external audio signal by controlling the microphone (for example, the first microphone 161 and/or the second microphone 162) according to the changed operation frequency.

Figure 6:
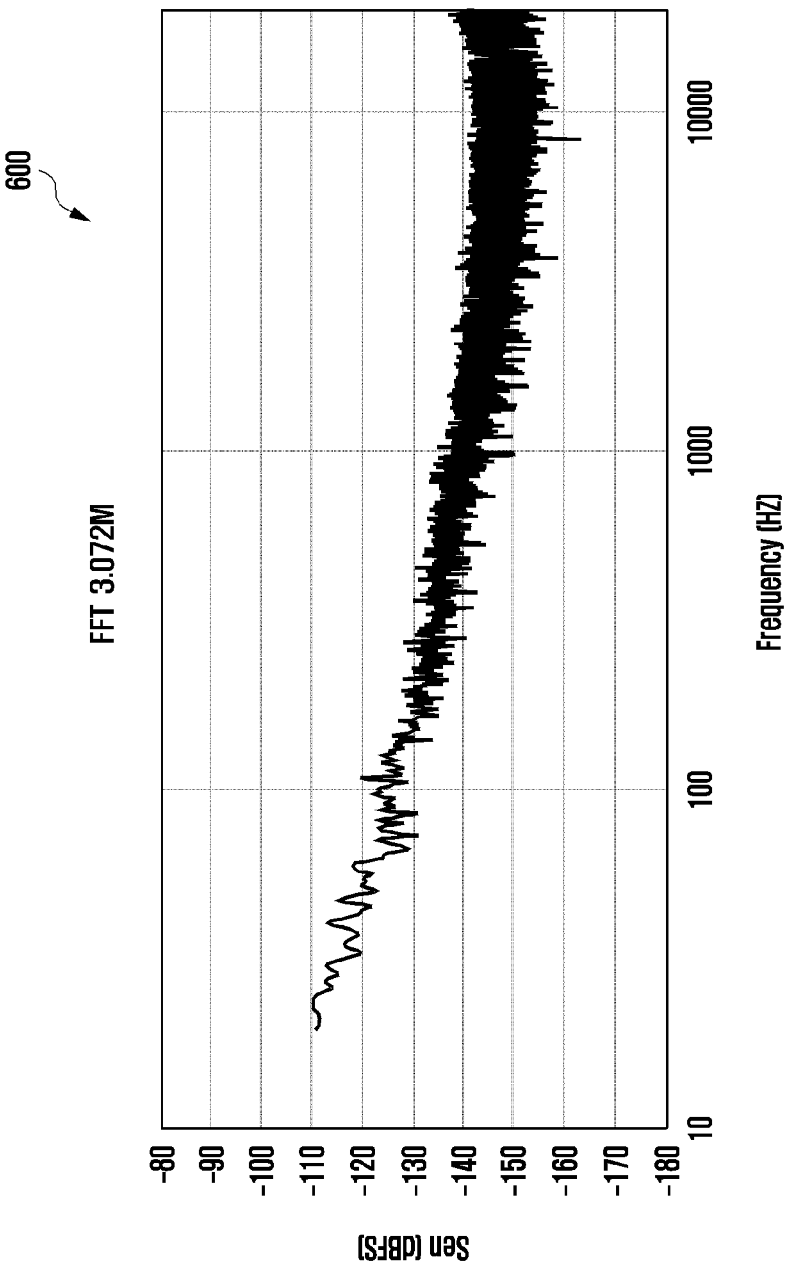
FIG. 6 illustrates an example graph in the amount of self-noise corresponding to an operation frequency of the microphone according to various embodiments.

FIG. 6 illustrates an example graph (for example, a first graph 600) having the self-noise size corresponding to the operation frequency of the microphone according to various embodiments.

Figure 7:
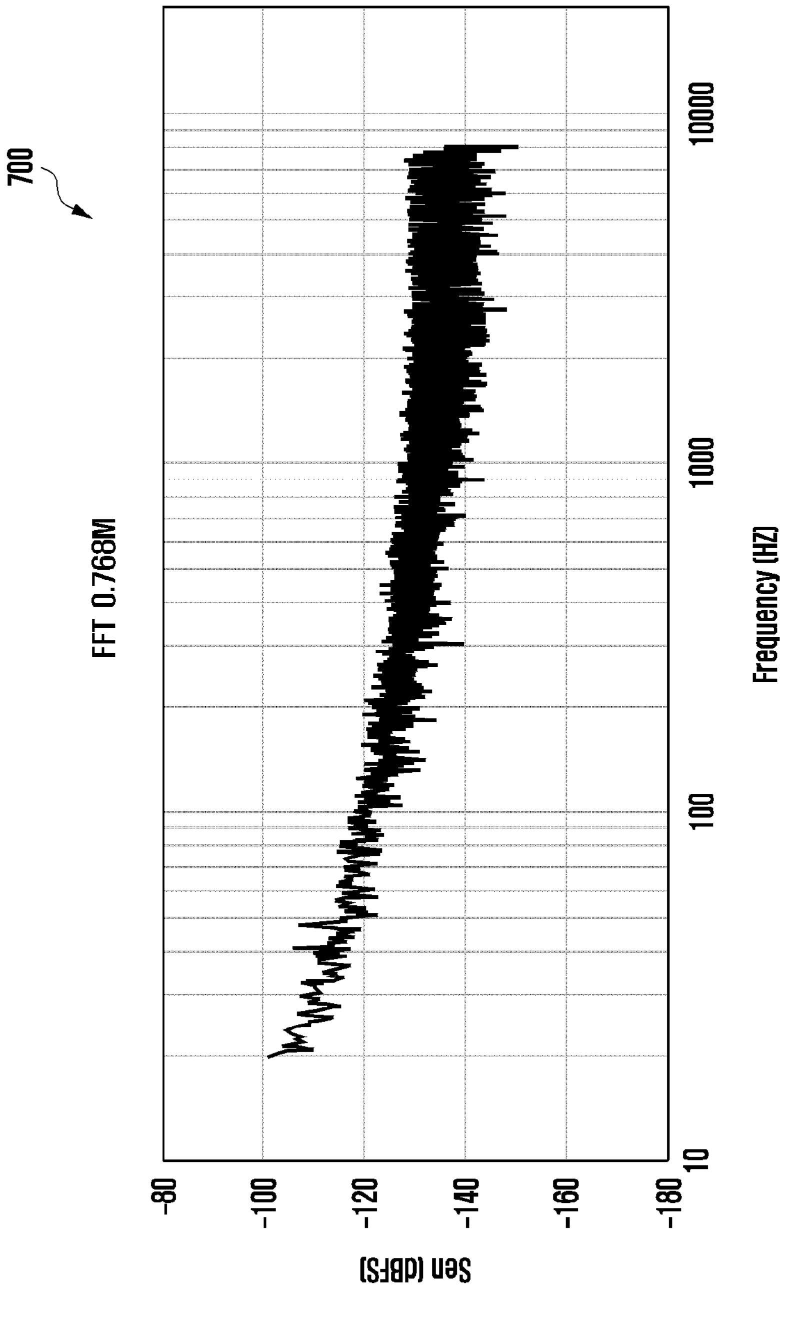
FIG. 7 illustrates an example graph in the size of self-noise depending on an operation frequency of the microphone according to various embodiments.

FIG. 7 illustrates an example graph (for example, a second graph 700) having the self-noise size corresponding to the operation frequency of the microphone according to various embodiments.

Referring to FIG. 6, the first graph 600 is a graph showing a fast Fourier transform (FFT) model for the size of a self-noise (residual noise, equivalent input noise (EIN), or sensitivity (sen)) model when the operation frequency of the microphone (for example, the first microphone 161 and/or the second microphone 162 of FIG. 3) has the highest value (for example, a maximum operation frequency). Self-noise may be noise generated by the microphone when the external audio signal is received by the electronic device (for example, the electronic device 101 of FIG. 1 or the electronic device 101 of FIG. 3) through the microphone. For example, the self-noise may be noise generated by the electronic device 101 by itself.

Referring to FIG. 7, the second graph 700 is a graph showing a fast Fourier transform (FFT) model for the size of self-noise when the operation frequency of the microphone (for example, the first microphone 161 and/or the second microphone 162 of FIG. 3) has the lowest value (for example, a minimum operation frequency).

Referring to FIGS. 6 and 7, the maximum operation frequency of the microphone may be 3.072 MHz and the minimum operation frequency may be 0.768 MHz, but they are only example values and the maximum or minimum operation frequencies of the microphone are not limited thereto. Further, the values illustrated by the first graph 600 and/or the second graph 700 are only example values to show relative difference in self-noise according to decrease or increase in the operation frequency. Accordingly, the size of self-noise corresponding to the maximum or minimum operation frequency is not limited to the values of the first graph 600 and/or the second graph 700.

Referring to FIGS. 6 and 7, the horizontal axis of the first graph 600 and the second graph 700 indicate frequency. The vertical axis of the first graph 600 and the second graph 700 indicate the size of self-noise (residual noise, equivalent input noise (EIN), or self-equivalent noise (sen)).

In comparison between the first graph 600 and the second graph 700, the size of self-noise in a high operation frequency (for example, the maximum operation frequency) indicates a relatively small value compared to the size of self-noise in a low operation frequency (for example, the minimum operation frequency) based on the same microphone.

A power spectral density of self-noise corresponding to the operation frequency of the microphone may be expressed as shown in [Equation 1]. In [Equation 1], E(f) denotes a power spectral density of self-noise, e_rms denotes an effective value for power of noise (root-mean-square (RMS) mean), and f_s denotes the operation frequency.

$$E(f) = \text{e\_rms} \times \left(\frac{2}{\text{f\_s}}\right)^{\frac{1}{2}} \quad \text{[Equation 1]}$$

Referring to the result of the first graph 600 and the second graph 700 of FIGS. 6 and 7, self-noise of the microphone may decrease when the operation frequency of the microphone increases, and self-noise of the microphone may be increased when the operation frequency of the microphone decreases. The microphone may receive only an external audio signal at a level higher than self-noise and accordingly can receive a smaller external audio signal when the operation frequency of the microphone increases.

Figure 8:
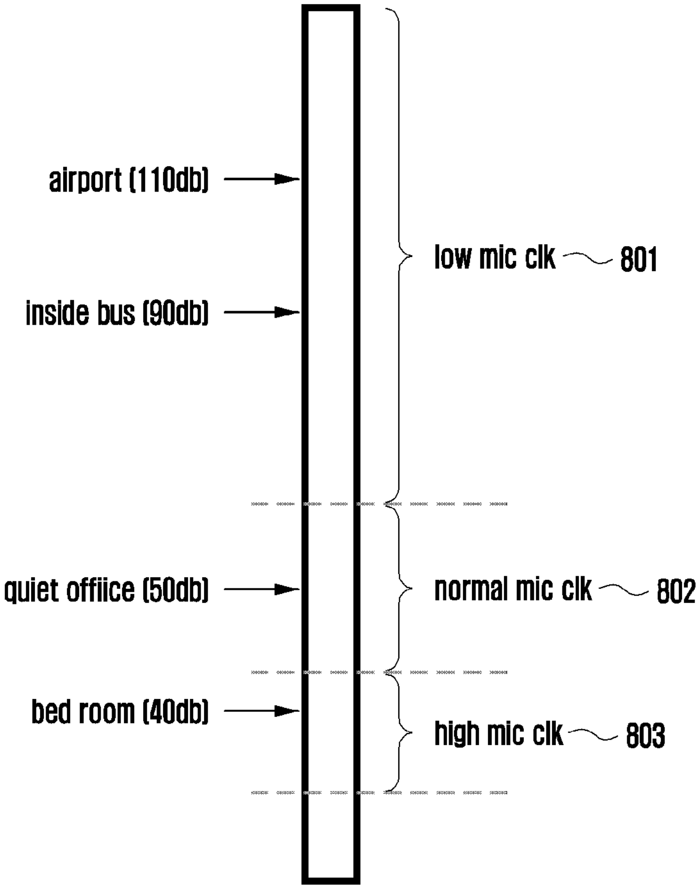
FIG. 8 illustrates example classification of operation frequencies of the microphones based on a level of an external audio signal according to various embodiments.

FIG. 8 illustrates example classification of operation frequencies of the microphone according to a level of the external audio signal according to various embodiments.

Referring to FIG. 8, the levels of the external audio signal may be divided into a bedroom level (about 40 dB), a quiet office level (about 50 dB), an inside bus level (about 90 dB), and an airport level (about 110 dB). The levels of the external audio signal generally indicate various sizes of the external audio signal (for example, noise) and correspond only to example values.

When the level of the external audio signal (for example, the noise signal) is high, a signal-to-noise ratio (SNR) value of the noise signal may have a positive correlation with the level of the noise signal. Accordingly, the electronic device (for example, the electronic device 101 of FIG. 1 or the electronic device 101 of FIG. 3) may receive the noise signal by controlling the microphone with a low operation frequency. On the other hand, when the level of the noise signal is low (for example 0.768 MHz or less), the SNR value of the noise signal may be very small. In this case, the electronic device 101 may receive the signal having a low SNR by controlling the microphone with a high operation frequency.

Further, when the operation frequency of the microphone is higher as illustrated in FIGS. 6 and 7, the electronic device 101 may generate self-noise at a relatively low level. According to an embodiment, the electronic device 101 may control the microphone with a high operation frequency 803 to receive a low-level sound when the level of the noise signal is low.

When the operation frequency of the microphone is low, the electronic device 101 may generate self-noise at a relatively high level. Accordingly, when the level of the noise signal is high, the generation of a high-level noise signal through the control of the microphone with a low operation frequency by the electronic device 101 may little influence the quality of the received noise signal. According to an embodiment, the electronic device 101 may control the microphone with a low operation frequency 801 in order to control the microphone with low power when the level of the noise signal is high.

According to an embodiment, when the level of the noise signal is relatively large or stays in an average state that is not small (for example, the quiet office level), the electronic device 101 may control the microphone with a predetermined operation frequency (for example, the first frequency).

Figure 9:
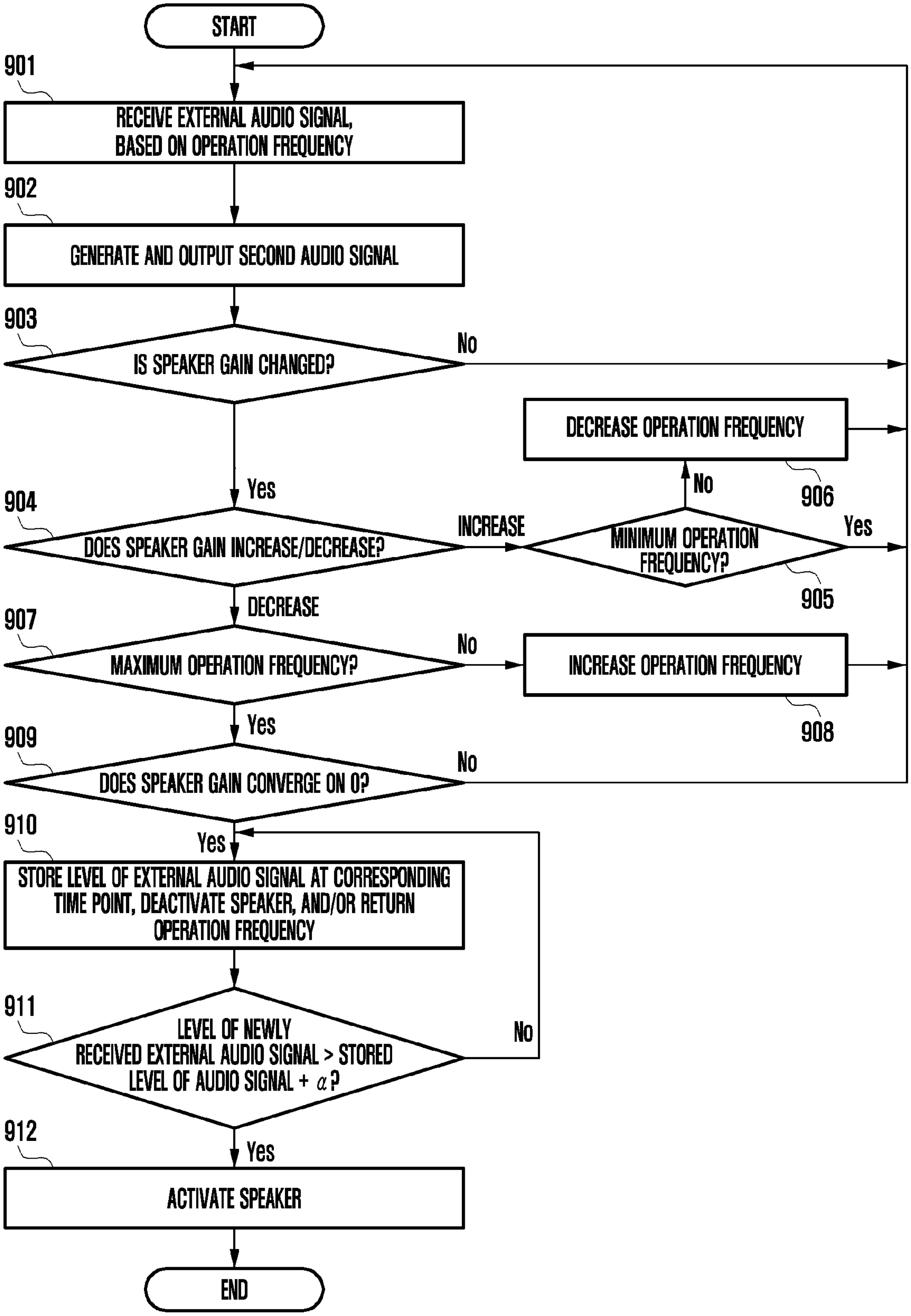
FIG. 9 is a flowchart illustrating an operation in which the example electronic device removes external noise according to various embodiments.

FIG. 9 is a flowchart illustrating an operation in which the example electronic device removes external noise according to various embodiments.

Referring to FIG. 9, the operation in which the electronic device (for example, the electronic device 101 of FIG. 1 or the electronic device 101 of FIG. 3) removes external noise may include a series of operations performed by a processor (for example, the processor 140 of FIG. 1 or the processor 140 of FIG. 3) of the electronic device. Some of the respective operations of FIG. 9 may be changed, exchanged, or replaced with other operations.

In operation 901, the processor 140 may receive an external audio signal based on an operation frequency of at least one microphone. According to an embodiment, the processor 140 may configure an operation frequency of the microphone (for example, the first microphone 161 and/or the second microphone 162 of FIG. 3) as a first frequency and receive the external audio signal. According to various embodiments, the processor 140 may receive the external audio signal from at least one microphone (for example, the first microphone 161 and/or the second microphone 162 of FIG. 3). According to an embodiment, at least one microphone may receive the external audio signal and the processor 140 may receive an electrically converted signal from at least one microphone.

At this time, the external audio signal may include an audio signal outside the electronic device 101. The audio signal outside of the electronic device 101 may include noise (for example, the first external audio signal) generated outside an ear (for example, external ear) of a user wearing the electronic device 101. For example, the processor 140 may receive an audio signal (for example, a first external audio signal) outside the electronic device 101 by controlling the first microphone 161. According to an embodiment, the external audio signal may include a signal (for example, a second external voice signal) obtained after external noise and a sound generated inside the electronic device 101 are transmitted to the outside of the electronic device 101 and received again through at least one microphone (for example, the second microphone 162). For example, the external audio signal may include all audio signals (for example, second external audio signals) transmitted to the inside of an ear (for example, internal ear) of a user wearing the electronic device 101 among sounds outside the electronic device 101. For example, the second external audio signal may include all audio signals transmitted through a physical sound insulation effect of the electronic device 101 among audio signals output from the speaker 165, noise (for example, hiss noise) generated by the electronic device 101, and/or noise (for example, the first external audio signal) generated outside the electronic device 101. For example, the processor 140 may receive an audio signal (for example, a second external audio signal) corresponding to sound outside the electronic device 101 by controlling the second microphone 162. According to an embodiment, the processor 140 may configure an operation frequency (for example, a first frequency) of at least one microphone and control at least one microphone to receive the external audio signal based on the configured operation frequency. The processor 140 may receive an electrical signal related to the external audio signal generated according to (predetermined) intervals corresponding to the predetermined operation frequency by at least one microphone. The first frequency may be, for example, an initially configured value for the operation frequency. The external audio signal may include a first external audio signal and a second external audio signal.

In operation 902, the processor 140 may generate and output a second audio signal. According to various embodiments, the processor 140 may generate a first audio signal and acquire noise signal information. The processor 140 may generate the first audio signal based on the received external audio signal. According to an embodiment, the first audio signal may include conversion of the external audio signal into a digital signal. According to an embodiment, the first audio signal may include a signal obtained by amplifying the external audio signal through an amplifier (for example, pre amplifier) and converting the same into a digital signal. According to an embodiment, the processor 140 may convert the first external audio signal and the second external audio signal into digital signals. For example, the processor 140 may generate a first digital signal obtained by converting the first external audio signal into a digital signal and a second digital signal obtained by converting a second external audio signal into a digital signal. According to an embodiment, the processor 140 may generate the first audio signal by combining the first digital signal and the second digital signal. According to an embodiment, the processor 140 may generate the first audio signal by processing the external audio signal. According to various embodiments, the processor 140 may acquire noise signal information based on the first audio signal. The noise signal information may include a signal related to noise among external sounds. According to an embodiment, the noise signal information may include the first audio signal. According to an embodiment, the noise signal information may include a signal within a predetermined frequency band range among the first audio signals. According to an embodiment, the processor 140 may generate the noise signal information based on the first audio signal generated through reception of the external sound by using at least one microphone and information on the audio signal output by the speaker 165. According to an embodiment, the processor 140 may generate the noise signal information by adding the first digital signal generated based on the first external audio signal and the second digital signal generated based on the second external audio signal. According to an embodiment, the processor 140 may generate the noise signal information by applying a predetermined signal processing scheme to the first audio signal. According to various embodiments, the processor 140 may generate and output the second audio signal based on the noise signal information. According to an embodiment, the processor 140 may generate the second audio signal by processing the noise signal. For example, the processor 140 may inverse-phase process the noise signal information and apply filtering, amplification, attenuation, and/or modulation to the noise signal information or the inverse phase signal of the noise signal information. According to an embodiment, the processor 140 may generate the second audio signal for attenuating the noise signal based on the noise signal information. According to an embodiment, the second audio signal may include an audio signal having amplitude substantially the same as the noise signal and having a phase opposite thereto. According to an embodiment, the processor 140 may output the second audio signal by controlling the speaker (for example, the speaker 165 of FIG. 3).

Referring to operation 903, the processor 140 may identify whether the gain of the speaker 165 is changed. According to various embodiments, the processor 140 may identify the gain of the speaker 165 for outputting the second audio signal. The processor 140 may continuously and/or periodically identify the gain of the speaker 165 while the second audio signal is output. The processor 140 may identify whether the gain of the speaker 165 is changed using a predetermined threshold value. The processor 140 may identify whether the gain of the speaker 165 is changed based on a large increase or decrease in the gain of the speaker 165 compared to a previous gain of the speaker 165. In another embodiment, the processor 140 may identify the gain of the speaker 165 in real time without the application of the threshold value to the gain of the speaker 165, and when the gain is changed, identify whether the gain of the speaker 165 is changed. According to an embodiment, the processor 140 may proceed to operation 904 when the gain of the speaker 165 is changed and proceed to operation 901 when the gain of the speaker 165 is not changed.

Referring to operation 904, the processor 140 may identify whether the gain of the speaker 165 increases or decreases. According to various embodiments, the processor 140 may identify the gain of the speaker 165 outputting the second audio signal. The processor 140 may continuously and/or periodically identify the gain of the speaker 165 while the second audio signal is output. The processor 140 may identify the increase or decrease in the gain of the speaker 165 using a predetermined threshold value. The processor 140 may identify whether the gain of the speaker 165 increases or decreases based on an increase or decrease larger than the threshold value compared to a previous gain of the speaker 165. According to an embodiment, the processor 140 may proceed to operation 905 when the gain of the speaker 165 increases and proceed to operation 907 when the gain of the speaker 165 decreases.

In operation 905, the processor 140 may identify whether the operation frequency of the microphone reaches a minimum operation frequency. The minimum operation frequency may, for example, be a minimum value among operation frequencies which the operation frequency of the microphone can reach. According to an embodiment, the processor 140 may continuously and/or periodically identify the operation frequency of the microphone. According to an embodiment, the minimum operation frequency may be a predetermined value. According to an embodiment, the minimum operation frequency may have a different value depending on the hardware specification of the microphone. The processor 140 may return to operation 901 when the operation frequency of the microphone has reached the minimum operation frequency and proceed to operation 906 when the operation frequency of the microphone has not reached the minimum operation frequency.

In operation 906, the processor 140 may decrease the operation frequency. According to various embodiments, the processor 140 may change the operation frequency of the microphone (for example, the first microphone 161 and/or the second microphone 162 of FIG. 3). The processor 140 may receive an electrical signal related to an external audio signal received according to (predetermined) intervals corresponding to the (predetermined) operation frequency through at least one microphone and change the operation frequency. According to an embodiment, the processor 140 may configure different operation frequencies by separately controlling the first microphone 161 and the second microphone 162. According to an embodiment, the processor 140 may configure the operation frequencies all together by simultaneously controlling the first microphone 161 and the second microphone 162. The processor 140 may decrease the operation frequency of the microphone in accordance with an increase in the gain of the speaker 165. When the gain of the speaker 165 increases, a level of noise of the external audio signal may be high. In this case, an SNR of the noise signal is relatively high and a level of self-noise (residual noise or equivalent input noise (EIN)) of the microphone is relatively smaller than the level of the noise of the external audio signal. Accordingly, even when the operation frequency of the microphone is low, it is possible to sufficiently receive the external sound and reduce power consumption of the microphone due to the decrease in the operation frequency of the microphone.

In operation 907, the processor 140 may identify whether the operation frequency of the microphone has reached a maximum operation frequency. The maximum operation frequency may, for example, be a maximum value among operation frequencies which the operation frequency of the microphone can reach. According to an embodiment, the processor 140 may continuously and/or periodically identify the operation frequency of the microphone. According to an embodiment, the maximum operation frequency may be a predetermined value. According to an embodiment, the maximum operation frequency may have a different value depending on the hardware specification of the microphone. The processor 140 may proceed to operation 908 when the operation frequency of the microphone has not reached the maximum operation frequency and proceed to operation 909 when the operation frequency of the microphone has reached the maximum operation frequency.

In operation 908, the processor 140 may increase the operation frequency. According to various embodiments, the processor 140 may change the operation frequency of the microphone (for example, the first microphone 161 and/or the second microphone 162 of FIG. 3). The processor 140 may receive an electrical signal related to the external audio signal generated according to (predetermined) intervals corresponding to the (predetermined) operation frequency through at least one microphone and change the operation frequency. According to an embodiment, the processor 140 may configure different operation frequencies by separately controlling the first microphone 161 and the second microphone 162. According to an embodiment, the processor 140 may configure the operation frequencies all together by simultaneously controlling the first microphone 161 and the second microphone 162. The processor 140 may increase the operation frequency of the microphone in accordance with a decrease in the gain of the speaker 165. When the gain of the speaker 165 decreases, a level of noise of the external audio signal may be low. In this case, an SNR of the noise signal may be relatively low and a level of self-noise (residual noise or equivalent input noise (EIN)) may be relatively higher than the level of the noise of the external audio signal. Accordingly, the processor 140 may increase the operation frequency of the microphone in order to receive the external audio signal having a relatively low level.

In operation 909, the processor 140 may identify whether the gain of the speaker (for example, the speaker 165 of FIG. 3) converges to 0. According to an embodiment, when the operation frequency of the microphone reaches the predetermined maximum operation frequency, the processor 140 may identify the gain of the speaker 165. For example, the processor 140 may identify whether the gain of the speaker 165 has a value of 0 or a value substantially corresponding to 0. The processor 140 may identify whether the gain of the speaker 165 converges to 0 based on whether the gain of the speaker 165 is smaller than a predetermined threshold value. The case in which the gain of the speaker 165 is 0 may be a case in which, for example, the processor 140 does not output audio data (for example, sound source data or call voice data) other than the second audio signal for removing noise. Accordingly, when the processor 140 outputs audio data other than the second audio signal, the processor 140 may not perform operations 910, 911, and 912. The processor 140 may proceed to operation 910 when the gain of the speaker 165 converges to 0 and may return to operation 901 when the gain of the speaker 165 does not converge to 0 (larger than 0).

In operation 910, the processor 140 may perform at least one of an operation of storing the level of the external audio signal, an operation of deactivating the speaker, and an operation of returning the operation frequency to a first frequency. According to an embodiment, when it is identified that the gain of the speaker 165 converges to 0, the processor 140 may store the level of the external audio signal at a corresponding time point. For example, the processor 140 may identify that the gain of the speaker 165 substantially becomes 0 and store the level value of the external audio signal acquired through the first microphone 161 and/or the second microphone 162 in a memory (for example, the memory 130 of FIG. 1). According to an embodiment, when it is identified that the gain of the speaker 165 converges on 0, the processor 140 may deactivate the speaker 165. The case in which the gain of the speaker 165 converges on 0 may be a case in which the level of the noise signal converges on 0 or the level of the noise signal is too low to be substantially received by the microphone. In this case, the processor 140 may reduce power consumption by deactivating the speaker 165. According to an embodiment, when the gain of the second audio signal converges on 0, the processor 140 may store the level value of the external audio signal acquired by the microphone at the corresponding time point and deactivate the speaker 165. According to an embodiment, when the gain of the second audio signal converges on 0, the processor 140 may return the operation frequency of the microphone from the changed operation frequency (for example, the second operation frequency) to an initial value (for example, the first operation frequency) based on the second audio signal. The initial value may be a predetermined default operation frequency (for example, the first operation frequency).

In operation 911, after storing the level of the external audio signal, the processor 140 may identify whether a level of a newly received external audio signal increases by a predetermined value or more compared to the stored level of the external audio signal. According to an embodiment, the processor 140 may identify whether the level of the newly received external audio signal is larger than a predetermined threshold value based on the level of the external audio signal stored when the gain of the second audio signal converges on 0.

In operation 912, when the level of the newly received external audio signal increases to be larger than the predetermined threshold value compared to the stored level of the external audio signal, the processor 140 may reactivate the deactivated speaker 165. The processor 140 may return back to operation 901 after operation 912.

Figure 10:
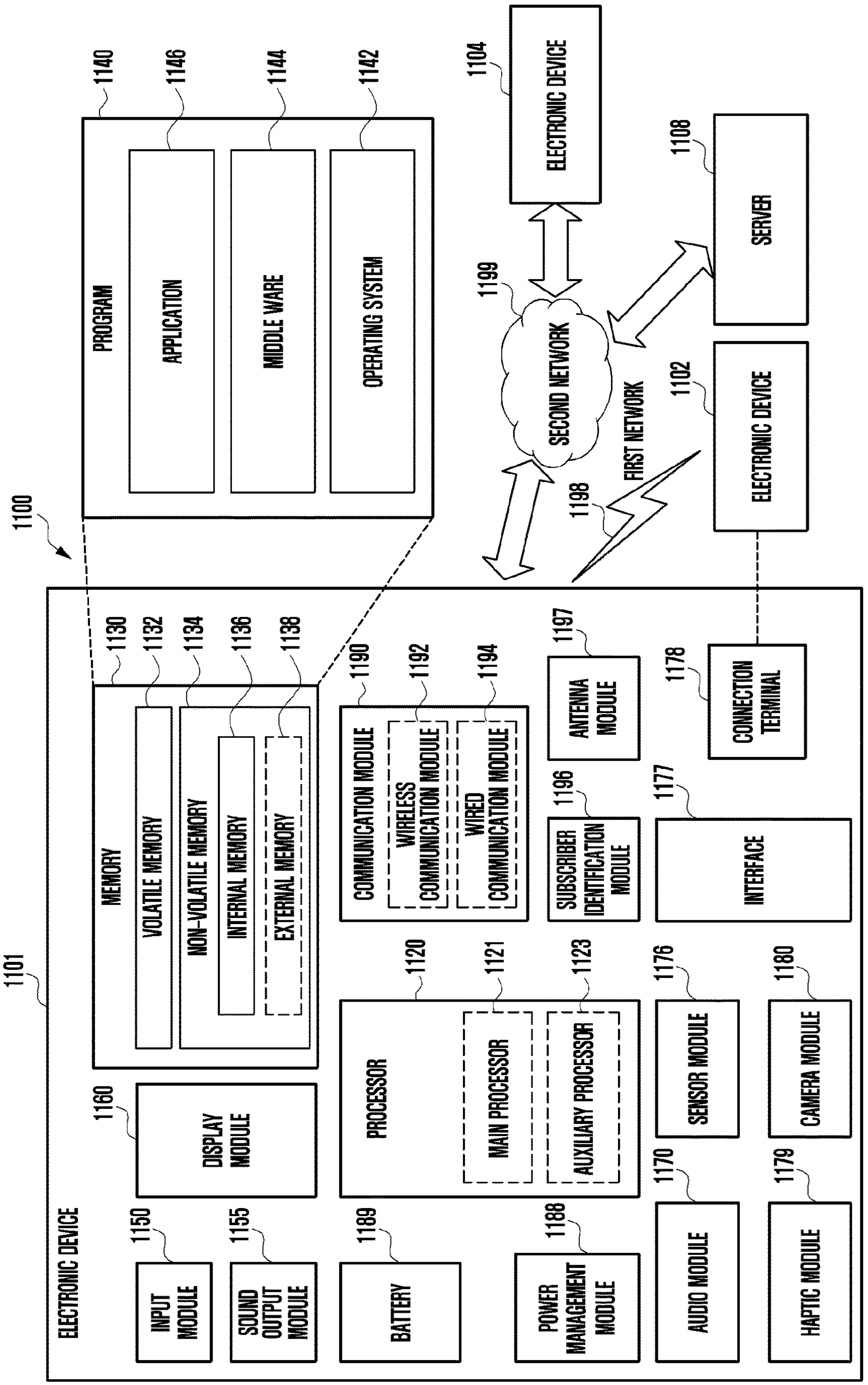
FIG. 10 is a block diagram of the example electronic device within a network environment according to various embodiments.

FIG. 10 is a block diagram illustrating an electronic device 1101 in a network environment 1100 according to various embodiments. Referring to FIG. 10, the electronic device 1101 in the network environment 1100 may communicate with an electronic device 1102 via a first network 1198 (e.g., a short-range wireless communication network), or at least one of an electronic device 1104 or a server 1108 via a second network 1199 (e.g., a long-range wireless communication network). According to an embodiment, the electronic device 1101 may communicate with the electronic device 1104 via the server 1108. According to an embodiment, the electronic device 1101 may include a processor 1120, memory 1130, an input module 1150, a sound output module 1155, a display module 1160, an audio module 1170, a sensor module 1176, an interface 1177, a connection terminal 1178, a haptic module 1179, a camera module 1180, a power management module 1188, a battery 1189, a communication module 1190, a subscriber identification module (SIM) 1196, or an antenna module 1197. In various embodiments, at least one of the components (e.g., the connecting terminal 1178) may be omitted from the electronic device 1101, or one or more other components may be added in the electronic device 1101. In various embodiments, some of the components (e.g., the sensor module 1176, the camera module 1180, or the antenna module 1197) may be implemented as a single component (e.g., the display module 1160).

The processor 1120 may execute, for example, software (e.g., a program 1140) to control at least one other component (e.g., a hardware or software component) of the electronic device 1101 coupled with the processor 1120, and may perform various data processing or computation. According to an embodiment, as at least part of the data processing or computation, the processor 1120 may store a command or data received from another component (e.g., the sensor module 1176 or the communication module 1190) in volatile memory 1132, process the command or the data stored in the volatile memory 1132, and store resulting data in non-volatile memory 1134. According to an embodiment, the processor 1120 may include a main processor 1121 (e.g., a central processing unit (CPU) or an application processor (AP)), or an auxiliary processor 1123 (e.g., a graphics processing unit (GPU), a neural processing unit (NPU), an image signal processor (ISP), a sensor hub processor, or a communication processor (CP)) that is operable independently from, or in conjunction with, the main processor 1121. For example, when the electronic device 1101 includes the main processor 1121 and the auxiliary processor 1123, the auxiliary processor 1123 may be adapted to consume less power than the main processor 1121, or to be specific to a specified function. The auxiliary processor 1123 may be implemented as separate from, or as part of the main processor 1121.

The auxiliary processor 1123 may control at least some of functions or states related to at least one component (e.g., the display module 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). According to an embodiment, the auxiliary processor 1123 (e.g., an image signal processor or a communication processor) may be implemented as part of another component (e.g., the camera module 1180 or the communication module 1190) functionally related to the auxiliary processor 1123. According to an embodiment, the auxiliary processor 1123 (e.g., the neural processing unit) may include a hardware structure specified for artificial intelligence model processing. An artificial intelligence model may be generated by machine learning. Such learning may be performed, e.g., by the electronic device 1101 where the artificial intelligence is performed or via a separate server (e.g., the server 1108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1130 may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input module 1150 may receive a command or data to be used by another component (e.g., the processor 1120) of the electronic device 1101, from the outside (e.g., a user) of the electronic device 1101. The input module 1150 may include, for example, a microphone, a mouse, a keyboard, a key (e.g., a button), or a digital pen (e.g., a stylus pen).

The sound output module 1155 may output sound signals to the outside of the electronic device 1101. The sound output module 1155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1160 may visually provide information to the outside (e.g., a user) of the electronic device 1101. The display module 1160 may include, for example, a display, a hologram device, or a projector and control circuitry to control a corresponding one of the display, hologram device, and projector. According to an embodiment, the display module 1160 may include a touch sensor adapted to detect a touch, or a pressure sensor adapted to measure the intensity of force incurred by the touch.

The audio module 1170 may convert a sound into an electrical signal and vice versa. According to an embodiment, the audio module 1170 may obtain the sound via the input module 1150, or output the sound via the sound output module 1155 or a headphone of an external electronic device (e.g., an electronic device 1102) directly (e.g., wiredly) or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. According to an embodiment, the sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device (e.g., the electronic device 1102) directly (e.g., wiredly) or wirelessly. According to an embodiment, the interface 1177 may include, for example, a high definition multimedia interface (HDMI), a universal serial bus (USB) interface, a secure digital (SD) card interface, or an audio interface.

A connection terminal 1178 may include a connector via which the electronic device 1101 may be physically connected with the external electronic device (e.g., the electronic device 1102). According to an embodiment, the connection terminal 1178 may include, for example, a HDMI connector, a USB connector, a SD card connector, or an audio connector (e.g., a headphone connector).

The haptic module 1179 may convert an electrical signal into a mechanical stimulus (e.g., a vibration or a movement) or electrical stimulus which may be recognized by a user via his tactile sensation or kinesthetic sensation. According to an embodiment, the haptic module 1179 may include, for example, a motor, a piezoelectric element, or an electric stimulator.

The camera module 1180 may capture a still image or moving images. According to an embodiment, the camera module 1180 may include one or more lenses, image sensors, image signal processors, or flashes.

The power management module 1188 may manage power supplied to the electronic device 1101. According to an embodiment, the power management module 1188 may be implemented as at least part of, for example, a power management integrated circuit (PMIC).

The battery 1189 may supply power to at least one component of the electronic device 1101. According to an embodiment, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more communication processors that are operable independently from the processor 1120 (e.g., the application processor (AP)) and supports a direct (e.g., wired) communication or a wireless communication. According to an embodiment, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as Bluetooth™ wireless-fidelity (Wi-Fi) direct, or infrared data association (IrDA)) or the second network 1199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1192 may identify and authenticate the electronic device 1101 in a communication network, such as the first network 1198 or the second network 1199, using subscriber information (e.g., international mobile subscriber identity (IMSI)) stored in the subscriber identification module 1196. The wireless communication module 1192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1192 may support a high-frequency band (e.g., the mmWave band) to achieve, e.g., a high data transmission rate. The wireless communication module 1192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1192 may support various requirements specified in the electronic device 1101, an external electronic device (e.g., the electronic device 1104), or a network system (e.g., the second network 1199). According to an embodiment, the wireless communication module 1192 may support a peak data rate (e.g., 20 Gbps or more) for implementing eMBB, loss coverage (e.g., 1164 dB or less) for implementing mMTC, or U-plane latency (e.g., 0.5 ms or less for each of downlink (DL) and uplink (UL), or a round trip of 11 ms or less) for implementing URLLC.

The antenna module 1197 may transmit or receive a signal or power to or from the outside (e.g., the external electronic device) of the electronic device 1101. According to an embodiment, the antenna module 1197 may include an antenna including a radiating element composed of or including a conductive material or a conductive pattern formed in or on a substrate (e.g., a printed circuit board (PCB)). According to an embodiment, the antenna module 1197 may include a plurality of antennas (e.g., array antennas). In such a case, at least one antenna appropriate for a communication scheme used in the communication network, such as the first network 1198 or the second network 1199, may be selected, for example, by the communication module 1190 (e.g., the wireless communication module 1192) from the plurality of antennas. The signal or the power may then be transmitted or received between the communication module 1190 and the external electronic device via the selected at least one antenna. According to an embodiment, another component (e.g., a radio frequency integrated circuit (RFIC)) other than the radiating element may be additionally formed as part of the antenna module 1197.

According to various embodiments, the antenna module 1197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1101 and the external electronic device 1104 via the server 1108 coupled with the second network 1199. Each of the electronic devices 1102 or 1104 may be a device of a same type as, or a different type, from the electronic device 1101. According to an embodiment, all or some of operations to be executed at the electronic device 1101 may be executed at one or more of the external electronic devices 1102, 1104, or 1108. For example, if the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101.

The electronic device 1101 may provide the outcome, with or without further processing of the outcome, as at least part of a reply to the request. To that end, a cloud computing, distributed computing, mobile edge computing (MEC), or client-server computing technology may be used, for example. The electronic device 1101 may provide ultra low-latency services using, e.g., distributed computing or mobile edge computing. In another embodiment, the external electronic device 1104 may include an internet-of-things (IoT) device. The server 1108 may be an intelligent server using machine learning and/or a neural network. According to an embodiment, the external electronic device 1104 or the server 1108 may be included in the second network 1199. The electronic device 1101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1140) including one or more instructions that are stored in a storage medium (e.g., internal memory 1136 or external memory 1138) that is readable by a machine (e.g., the electronic device 1101). For example, a processor (e.g., the processor 1120) of the machine (e.g., the electronic device 1101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" storage medium refers, for example, to a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

An electronic device (for example, the electronic device 101 of FIG. 3) according to various embodiments of the disclosure may include at least one microphone (for example, the first microphone 161 of FIG. 3), a speaker (for example, the speaker 165 of FIG. 3), and a processor (for example, the processor 140 of FIG. 3) operatively connected to the at least one microphone and the speaker, and the processor may be configured to configure an operation frequency of the microphone as a first frequency and receive an external audio signal from the outside of the electronic device through the microphone operating at the first frequency, generate a first audio signal using the received external audio signal, acquire noise signal information, based on the first audio signal, output a second audio signal generated based on the noise signal information through the speaker, determine a second frequency, based on the generated second audio signal, and change the operation frequency of the microphone to the second frequency and receive the external audio signal from the outside of the electronic device through the microphone operating at the second frequency.

According to an embodiment, the second audio signal may include a signal processed to have a phase opposite to the noise signal information.

According to an embodiment, the processor may be configured to determine the second frequency, based on a gain of the second audio signal.

According to an embodiment, the processor may be configured to determine the second frequency as a value smaller than the first frequency when the gain of the second audio signal increases, and determine the second frequency as a value larger than the first frequency when the gain of the second audio signal decreases.

According to an embodiment, the processor may be configured to identify a gain of the second audio signal and, when the identified gain is smaller than a predetermined gain value, deactivate the speaker.

According to an embodiment, the processor may be configured to, when the identified gain is smaller than the predetermined gain value, store information on a level of the external audio signal received by the at least one microphone.

According to an embodiment, the processor may be configured to, when a level of an external audio signal newly received through the microphone becomes larger than the stored level of the external audio signal by a predetermined threshold value or more, reactivate the speaker.

According to an embodiment, the processor may be configured to, when the speaker is deactivated, rechange the operation frequency of the at least one microphone from the second operation frequency to the first operation frequency.

According to an embodiment, the processor may be configured to, when the speaker is deactivated, reactivate the speaker if the external audio signal received through the at least one microphone is larger than a predetermined level value.

According to an embodiment, the processor may be configured to identify whether the external audio signal is larger than the predetermined level value, based on a root mean square (RMS) value of some of external audio signals including a predetermined frequency band among the received external audio signals.

According to an embodiment, the processor may be configured to, when an audio signal other than the second audio signal is output through the speaker, not deactivate the speaker.

According to an embodiment, the at least one microphone may include a first microphone (for example the first microphone 161 of FIG. 3) and a second microphone (for example, the second microphone 162 of FIG. 3), the first microphone may be disposed in a first direction substantially opposite to a direction in which the speaker outputs a sound and configured to receive an external audio signal, the second microphone may be disposed in a second direction substantially equal to a direction in which the speaker outputs an audio signal and configured to receive an external audio signal of the electronic device including the audio signal output by the speaker, and the processor is configured to receive a first external audio signal by controlling the first microphone, receive a second external audio signal by controlling the second microphone, and acquire the noise signal information, based on the first external audio signal and the second external audio signal.

A method of outputting an audio signal by an electronic device including at least one microphone and at least one speaker according to various embodiments of the disclosure may include configuring an operation frequency of the microphone as a first frequency and generating a first audio signal using an external audio signal received from the outside of the electronic device through the microphone operating at the first frequency, acquiring noise signal information, based on the first audio signal, outputting a second audio signal generated based on the noise signal information through the speaker, determining a second frequency, based on the generated second audio signal, and changing the operation frequency of the microphone to the second frequency and receiving the external audio signal from the outside of the electronic device through the microphone operating in the second frequency.

According to an embodiment, the determining the second frequency may include an operation of determining the second frequency, based on a gain of the second audio signal.

According to an embodiment, the determining the second frequency may include, when a gain of the second audio signal increases, determining the second frequency as a value smaller than the first frequency and, when the gain of the second audio signal decreases, determining the second frequency as a value larger than the first frequency.

According to an embodiment, the method may further include identifying a gain of the second audio signal and, when the identified gain is smaller than a predetermined gain value, deactivating the speaker.

According to an embodiment, the method may further include, when the identified gain is smaller than the predetermined gain value, storing information on a level of the external audio signal received by the at least one microphone.

According to an embodiment, the method may further include, when the speaker is deactivated, rechange the operation frequency of the at least one microphone from the second operation frequency to the first operation frequency.

According to an embodiment, the method may further include, when the speaker is deactivated, reactivate the speaker if the external audio signal received through the at least one microphone is larger than a predetermined level value.

According to an embodiment, the at least one microphone may include a first microphone disposed in a first direction substantially opposite to a direction in which the speaker outputs a sound and configured to receive an external audio signal and a second microphone disposed in a second direction substantially equal to a direction in which the speaker outputs an audio signal and configured to receive an external audio signal of the electronic device including the audio signal output by the speaker, and the method may include receiving a first external audio signal by controlling the first microphone, receiving a second external audio signal by controlling the second microphone, and acquiring the noise signal information, based on the first external audio signal and the second external audio signal.

The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, a home appliance, or the like. The electronic device according to embodiments of the disclosure is not limited to those described above.

What is claimed is:

1. An electronic device comprising:

at least one microphone;

a speaker; and a processor operatively connected to the at least one microphone and the speaker, wherein the processor is configured to:

configure an operation frequency of the microphone as a first frequency and receive an external audio signal from the outside of the electronic device through the microphone operating at the first frequency;

generate a first audio signal using the received external audio signal;

acquire noise signal information, based on the first audio signal;

output a second audio signal generated based on the noise signal information through the speaker;

determine a second frequency, based on the generated second audio signal; and change the operation frequency of the microphone to the second frequency and receive the external audio signal from the outside of the electronic device through the microphone operating at the second frequency.

2. The electronic device of claim 1, wherein the second audio signal comprises a signal processed to have a phase opposite to the noise signal information.

3. The electronic device of claim 1, wherein the processor is configured to determine the second frequency, based on a gain of the second audio signal.

4. The electronic device of claim 1, wherein the processor is configured to:

determine the second frequency as a value smaller than the first frequency based on the gain of the second audio signal increasing; and determine the second frequency as a value larger than the first frequency based on the gain of the second audio signal decreasing.

5. The electronic device of claim 1, wherein the processor is configured to identify a gain of the second audio signal and, based on the identified gain being smaller than a predetermined gain value, deactivate the speaker.

6. The electronic device of claim 5, wherein the processor is configured to, based on the identified gain being smaller than the predetermined gain value, store information on a level of the external audio signal received by the at least one microphone.

7. The electronic device of claim 5, wherein the processor is configured to, based on a level of an external audio signal newly received through the microphone becoming larger than a stored level of the external audio signal by a predetermined threshold value or more, reactivate the speaker.

8. The electronic device of claim 5, wherein the processor is configured to, based on the speaker being deactivated, change the operation frequency of the at least one microphone from the second operation frequency to the first operation frequency.

9. The electronic device of claim 5, wherein the processor is configured to, based on the speaker being deactivated, reactivate the speaker based on the external audio signal received through the at least one microphone being larger than a predetermined level value.

10. The electronic device of claim 9, wherein the processor is configured to identify whether the external audio signal is larger than the predetermined level value, based on a root mean square (RMS) value of some of external audio signals including a predetermined frequency band among the received external audio signals.

11. The electronic device of claim 5, wherein the processor is configured to, based on an audio signal other than the second audio signal being output through the speaker, not deactivate the speaker.

12. The electronic device of claim 1, wherein the at least one microphone comprises a first microphone and a second microphone, wherein the first microphone is disposed in a first direction substantially opposite to a direction in which the speaker outputs a sound and configured to receive an external audio signal, wherein the second microphone is disposed in a second direction substantially equal to a direction in which the speaker outputs an audio signal and configured to receive an external audio signal of the electronic device including the audio signal output by the speaker, and wherein the processor is configured to:

receive a first external audio signal by controlling the first microphone;

receive a second external audio signal by controlling the second microphone; and acquire the noise signal information, based on the first external audio signal and the second external audio signal.

13. A method of outputting an audio signal by an electronic device comprising at least one microphone and at least one speaker, the method comprising:

configuring an operation frequency of the microphone as a first frequency and generating a first audio signal using an external audio signal received from the outside of the electronic device through the microphone operating in the first frequency;

acquiring noise signal information, based on the first audio signal;

outputting a second audio signal generated based on the noise signal information through the speaker;

determining a second frequency, based on the generated second audio signal; and changing the operation frequency of the microphone to the second frequency and receiving the external audio signal from the outside of the electronic device through the microphone operating at the second frequency.

14. The method of claim 13, wherein the determining of the second frequency comprises determining the second frequency, based on a gain of the second audio signal.

15. The method of claim 13, wherein the determining of the second frequency comprises:

based on a gain of the second audio signal increasing, determining the second frequency as a value smaller than the first frequency; and based on the gain of the second audio signal decreasing, determining the second frequency as a value larger than the first frequency.

16. The method of claim 13, further comprising:

identifying a gain of the second audio signal; and based on the identified gain being smaller than a predetermined gain value, deactivating the speaker.

17. The method of claim 16, further comprising, based on the identified gain being smaller than the predetermined gain value, storing information on a level of the external audio signal received by the at least one microphone.

18. The electronic device of claim 16, wherein the processor is configured to, based on the speaker being deactivated, rechange the operation frequency of the at least one microphone from the second operation frequency to the first operation frequency.

19. The electronic device of claim 16, wherein the processor is configured to, based on the speaker being deactivated, reactivate the speaker based on the external audio signal received through the at least one microphone being larger than a predetermined level value.

20. The method of claim 13, wherein the at least one microphone comprises a first microphone disposed in a first direction substantially opposite to a direction in which the speaker outputs a sound and configured to receive an external audio signal and a second microphone disposed in a second direction substantially equal to a direction in which the speaker outputs an audio signal and configured to receive an external audio signal of the electronic device including the audio signal output by the speaker, and wherein the method comprises:

receiving a first external audio signal by controlling the first microphone;

receiving a second external audio signal by controlling the second microphone; and acquiring the noise signal information, based on the first external audio signal and the second external audio signal.

* * * * *